(12) United States Patent
Teramoto et al.

(10) Patent No.: US 9,270,123 B2
(45) Date of Patent: Feb. 23, 2016

(54) WIRELESS POWER FEEDING SYSTEM

(75) Inventors: Shigeki Teramoto, Kanagawa (JP);
Takanori Washiro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 649 days.

(21) Appl. No.: 13/215,602

(22) Filed: Aug. 23, 2011

(65) Prior Publication Data

US 2012/0049646 A1    Mar. 1, 2012

(30) Foreign Application Priority Data

Aug. 30, 2010  (JP) ................................. 2010-191823
Nov. 5, 2010   (JP) ................................. 2010-248243

(51) Int. Cl.
*H01F 27/42* (2006.01)
*H02J 5/00* (2006.01)
*B60L 3/12* (2006.01)
*B60L 11/18* (2006.01)
*H04B 5/00* (2006.01)

(52) U.S. Cl.
CPC . *H02J 5/005* (2013.01); *B60L 3/12* (2013.01); *B60L 11/182* (2013.01); *B60L 11/1814* (2013.01); *B60L 11/1846* (2013.01); *H04B 5/0037* (2013.01); *B60L 2210/30* (2013.01); *B60L 2250/10* (2013.01); *B60L 2270/34* (2013.01); *Y02T 10/7005* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ........................................................ H02J 17/00
USPC ............................................................. 307/104
See application file for complete search history.

(56) References Cited

U.S. PATENT DOCUMENTS 8,344,688 B2 *   1/2013  Yoda et al. ..................... 320/107
2010/0289449 A1 * 11/2010 Elo ............................... 320/108

FOREIGN PATENT DOCUMENTS

| JP | 2004-287720 | 10/2004 |
| JP | 2005-158024 | 6/2005 |
| JP | 2010-028937 | 2/2010 |
| WO | 2006/038290 | 4/2006 |

* cited by examiner

*Primary Examiner* — Daniel Cavallari
(74) *Attorney, Agent, or Firm* — Hazuki International, LLC

(57) ABSTRACT

Disclosed herein is a wireless power feeding system, including: a power feeding apparatus including a wireless power transmitting grid transmitting an electric power for wireless power feeding, and a first wireless communication grid carrying out wireless communication; and a power receiving apparatus including a wireless power receiving grid receiving the electric power fed thereto from the power feeding apparatus, and a second wireless communication grid adapted to communicate with the first wireless communication system in a wireless manner, the power receiving apparatus serving to feed the electric power thus received to a power source circuit. In the wireless power feeding system one of the power feeding apparatus and the power receiving apparatus includes a control grid controlling availability of power consumption in the power receiving apparatus as a secondary side in accordance with a condition previously set after the power feeding apparatus and the power receiving apparatus carry out authentication.

18 Claims, 15 Drawing Sheets

F I G . 2
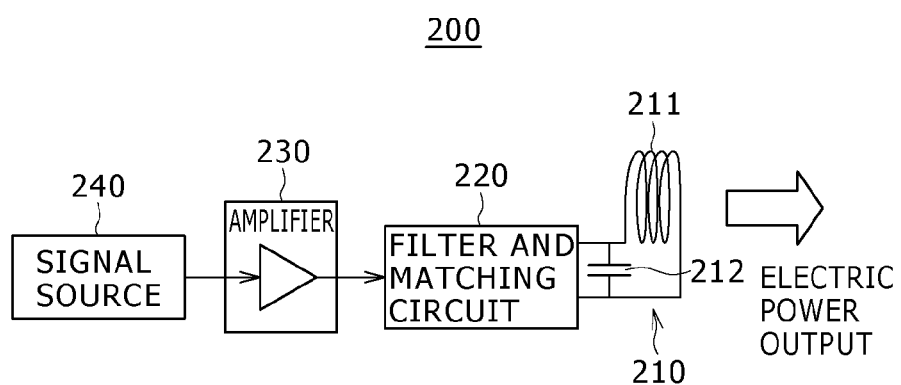
F I G . 3
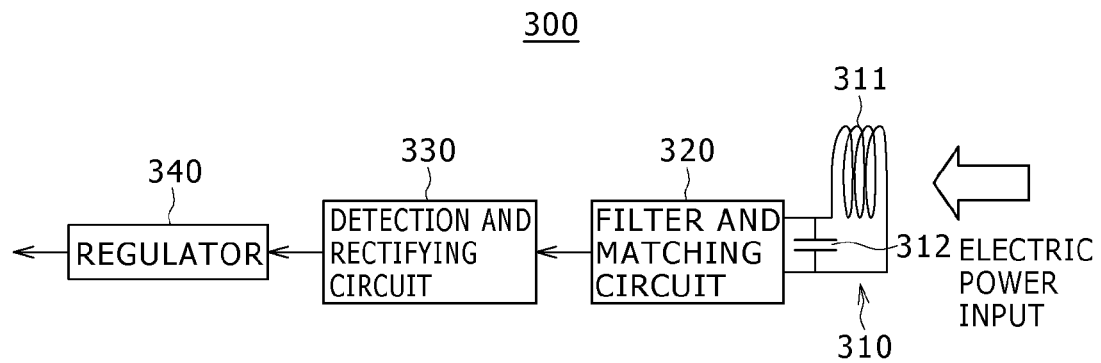

WIRELESS POWER FEEDING SYSTEM

BACKGROUND

The present disclosure relates to a wireless power feeding system including a wireless power feeding grid for transmitting and receiving an electric power in a non-contact (wireless) manner.

An electromagnetic induction system is known as a system for carrying out supply of an electric power in a non-contact (wireless) manner.

In addition, in recent years, a wireless power feeding apparatus and a wireless power feeding system each using a system called a magnetic field sympathetic resonance system utilizing an electromagnetic resonance phenomenon have attracted attention.

In the non-contact power feeding system utilizing the electromagnetic induction system which has already been generally used at present, a power feeding source and a power feeding destination (electric power receiving side) need to hold a magnetic flux in common. Thus, for the purpose of effectively feeding the electric power, the power feeding source and the power feeding destination need to be disposed in close proximity to each other. Also, axis alignment for the coupling between the power feeding source and the power feeding destination is also important.

On the other hand, the non-contact power feeding system using the electromagnetic sympathetic resonance phenomenon has advantages that it can feed the electric power at a distance as compared with the case of the electromagnetic induction system because of the principles of the electromagnetic sympathetic resonance phenomenon, and even when the axis adjustment is poor a little, the feeding efficiency is not reduced so much.

It is noted that an electric field sympathetic resonance system using the electromagnetic sympathetic resonance phenomenon is known in addition to the magnetic field sympathetic resonance system using the electromagnetic sympathetic resonance phenomenon.

In the wireless power feeding system of the magnetic field sympathetic resonance type, the axis alignment is unnecessary, and it is possible to lengthen the power feeding distance.

Such a wireless power feeding system, for example, can be applied to a power feeding service station for feeding an electric power to a mobile terminal such as a privately-owned mobile phone in a public place in a wireless manner.

Techniques, for example, disclosed in Japanese Patent Laid-Open Nos. 2008-185409, 2006-539114, 2004-173610, and 2003-77645 are known as this sort of technique.

SUMMARY

Now, with advance in technology, miniaturization of electronic apparatuses such as IT (information technology) products has progressed.

In such a situation, there are also a large number of products each equipped with a large-capacity battery for enhancement of usability.

However, there is caused a problem that usable time is limited due to the capacity of the battery, and when the battery capacity is increased in order to increase operating time, a size and a weight of the battery itself are increased, which impedes the further miniaturization of the product.

In addition, in such a billing system as to rent such products, basically, only the management of products based on an operation can be carried out, and thus it may be impossible to limit a place where such a product is used. Therefore, there is the possibility that the product is stolen and is used in a different place.

The present disclosure has been made in order to solve the problems described above, and it is therefore desirable to provide a wireless power feeding system which is capable of limiting a place and time at which an electronic apparatus on a power receiving side is used to allow a protection against theft to be realized, and is capable of realizing miniaturization and weight saving of an electronic apparatus because the electronic apparatus needs not to be equipped with a large-capacity battery.

In order to attain the desire described above, according to an embodiment of the present disclosure, there is provided a wireless power feeding system including: a power feeding apparatus including a wireless power transmitting grid transmitting an electric power for wireless power feeding, and a first wireless communication grid carrying out wireless communication; and a power receiving apparatus including a wireless power receiving grid receiving the electric power fed thereto from the power feeding apparatus, and a second wireless communication grid adapted to communicate with the first wireless communication grid in a wireless manner, the power receiving apparatus serving to feed the electric power thus received to a power source circuit, in which one of the power feeding apparatus and the power receiving apparatus includes a control grid controlling availability of power consumption in the power receiving apparatus as a secondary side in accordance with a condition previously set after the power feeding apparatus and the power receiving apparatus carry out authentication.

As set forth hereinabove, according to an embodiment of the present disclosure, both the wireless communication and the wireless power feeding can be optimized to be efficiently operated.

In addition, the place and time at which the electronic apparatus on the power receiving side is used can be limited to allow the protection against the theft to be realized. Also, the miniaturization and weight saving of the electronic apparatus can be realized because the electronic apparatus needs not to be equipped with the large-capacity battery.

BRIEF DESCRIPTION OF THE DRAWINGS

FIG. 2 is a block diagram, partly in circuit, showing a basic configuration of a power transmitting system in the wireless power feeding system according to the first embodiment of the present disclosure;

FIG. 3 is a block diagram, partly in circuit, showing a basic configuration of a power receiving system in the wireless power feeding system according to the first embodiment of the present disclosure;

DETAILED DESCRIPTION OF THE PREFERRED EMBODIMENTS

Embodiments of the present disclosure will be described in detail hereinafter with reference to the accompanying drawings.

It is noted that the description will be given below in accordance with the following order:
1. First Embodiment (First Configuration of Wireless Power Feeding System);
2. Second Embodiment (Second Configuration of Wireless Power Feeding System);
3. Third Embodiment (Third Configuration of Wireless Power Feeding System);
4. Fourth Embodiment (Fourth Configuration of Wireless Power Feeding System);
5. Fifth Embodiment (Fifth Configuration of Wireless Power Feeding System); and
6. Sixth Embodiment (Sixth Configuration of Wireless Power Feeding System)

1. First Embodiment

Figure 1:
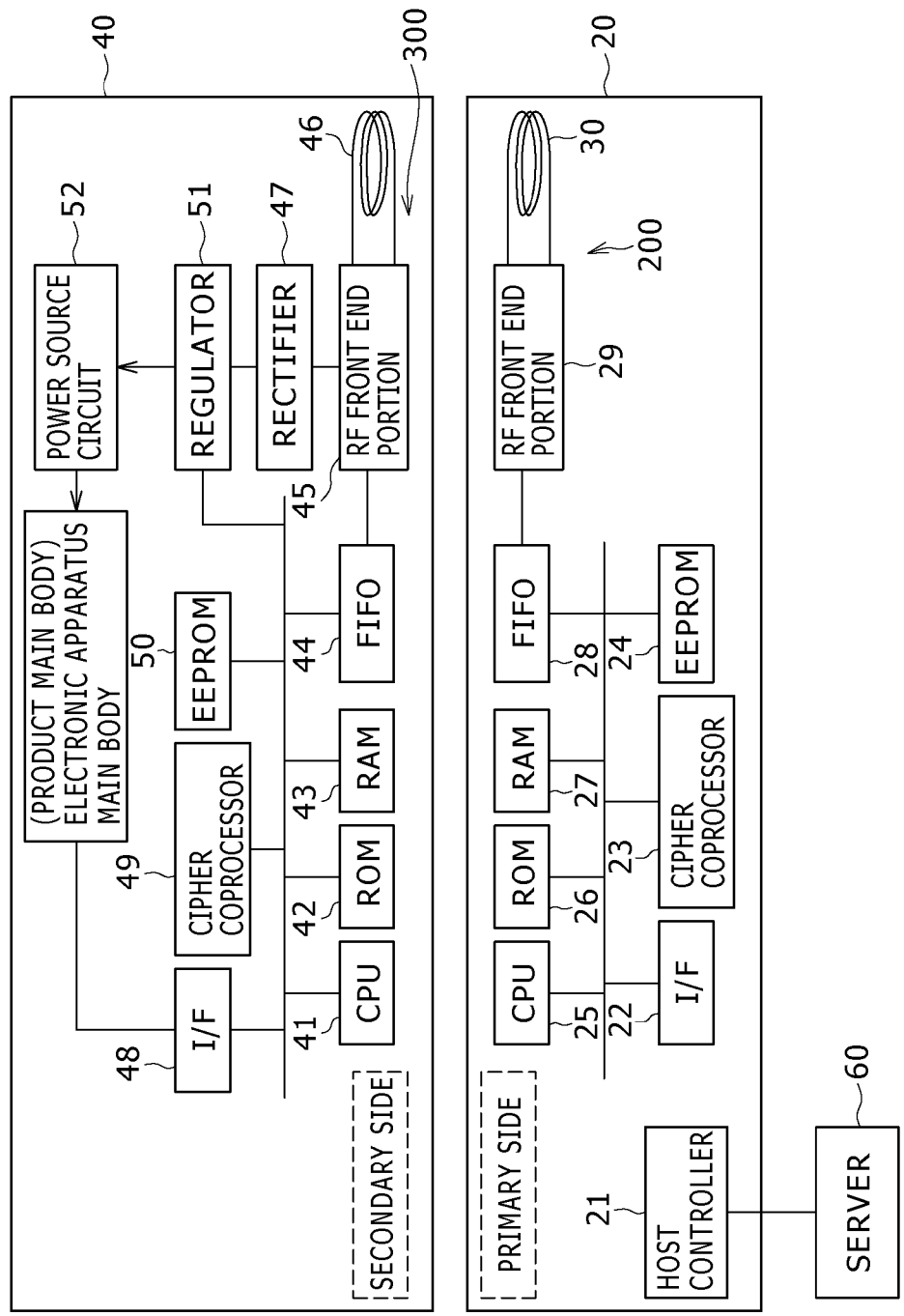
FIG. 1 is a block diagram showing a configuration of a wireless power feeding system according to a first embodiment of the present disclosure.

FIG. 1 is a block diagram showing a configuration of a wireless power feeding system according to a first embodiment of the present disclosure.
[Basic Configuration of Wireless Power Feeding System]

A wireless power feeding system 10 includes a wireless power feeding apparatus (primary side apparatus) 20, a power receiving apparatus (secondary side apparatus) 40 as an electronic apparatus (set product) which is not basically equipped with a battery, and a server 60.

After the primary side (power feeding side) and the secondary side (power receiving side) carry out authentication in an electronic apparatus (IT product) which has a wireless power feeding mechanism and is not equipped with a battery, the wireless power feeding system 10 controls availability of power consumption on the secondary side in accordance with a condition previously set.

As a result, the weight saving of the electronic apparatus can be realized. At the same time, the wireless power feeding system 10 can carry out control using an authorization condition setting of the power consumption in the electronic apparatus, and can be operated in conjunction with a billing system.

For example, when the power feeding is carried out and the power consumption on the electronic apparatus side is not authorized, the electronic apparatus on the secondary side is inhibited from being operated, whereby the electronic apparatus can be used only in a place where a predetermined secondary side terminal is provided. As a result, it is possible to reduce the possibility that the electronic apparatus is stolen.

Hereinafter, configurations and functions of portions of the wireless feeding system 10 will be concretely described.

The wireless feeding system 10, as described above, includes the power feeding apparatus 20 on the primary side, and the power receiving apparatus 40 on the secondary side.

The wireless power feeding apparatus 20 on the primary side includes a host controller 21, and a communication interface (I/F) 22 through which a communication with the host controller 21 is made.

The wireless power feeding apparatus 20 includes a cipher coprocessor 23 and an EEPROM (non-volatile memory) 24. In this case, the cipher coprocessor 23 is used in exchange of authentication or secret information. Secret information such as a cipher key necessary to carry out the authentication, a personalized ID on the primary side, and the like are stored in the EEPROM 24.

The wireless power feeding apparatus 20 includes a CPU (computer) 25 as a control grid, a ROM (read only memory) 26, a RAM (random access memory) 27, and an I/F (interface) 28 including a FIFO (first in, first out) with an RF front end portion 29. In this case, firmware for controlling the authentication and the power feeding state, and the like are stored in the ROM 26.

Also, the wireless power feeding portion 20 includes an RF front end portion 29, and an antenna 30 for the power feeding and communication. In this case, the RF front end portion 29 is composed of a circuit for data modulation and data demodulation in a phase of communication, an amplifier for driving the antenna, and the like.

In addition, a host controller 21 of the wireless power feeding apparatus 20 on the primary side is connected to an external server 60.

The power receiving apparatus 40 on the secondary side includes a CPU 41 as a control grid, a ROM 42 and a RAM 43 as memories, and an I/F 44 including a FIFO with an RF front end portion 45.

The power receiving apparatus 40 includes the RF front end portion 45, and an antenna 46 for the power receiving and communication. In this case, the RF front end portion 45 is composed of a circuit for modulation and demodulation in a phase of communication, and the like.

The power receiving apparatus 40 includes a rectifier 47 and an I/F 48. In this case, the rectifier 47 converts an electric power obtained from the antenna 46 into a voltage at a D.C. (direct current) level. The I/F 48 is used when a host controller is required.

The power receiving apparatus 40 includes a cipher coprocessor 49 and an EEPROM (non-volatile memory) 50. In this case, the cipher coprocessor 49 is used in exchange of authentication and secret information. Secret information such as a cipher key necessary to carry out the authentication, a personalized ID on the secondary side, and the like are stored in the EEPROM 50.

The power receiving apparatus 40 includes a regulator 51, a power source circuit 52 on the set main body side, and the like. In this case, the regulator 51 converts the voltage at the D.C. level outputted from the rectifier 47 into a given voltage to supply the resulting given voltage to the power source circuit on the set main body side.

The wireless power feeding system 10 includes "a wireless power feeding grid" and "a wireless communication grid" which can be operated at the same time.

"The wireless power feeding grid" and "the wireless communication grid" are composed of the RF front end portion 29 and the antenna 30 of the wireless power feeding apparatus 20, and the RF front end portion 45 and the antenna 46 of the power receiving apparatus 40.

Also, with regard to the wireless power feeding grid, a power transmitting system 200 is composed of the RF front end portion 29 and the antenna 30 of the wireless power feeding apparatus 20. Also, a power receiving system 300 is composed of the RF front end portion 45 and the antenna 46 of the power receiving apparatus 40.

FIG. 2 is a block diagram, partly in circuit, showing a basic configuration of the power transmitting system in the wireless power feeding system according to the first embodiment of the present disclosure.

FIG. 3 is a block diagram, partly in circuit, showing a basic configuration of the power receiving system in the wireless power feeding system according to the first embodiment of the present disclosure.

Figure 4:
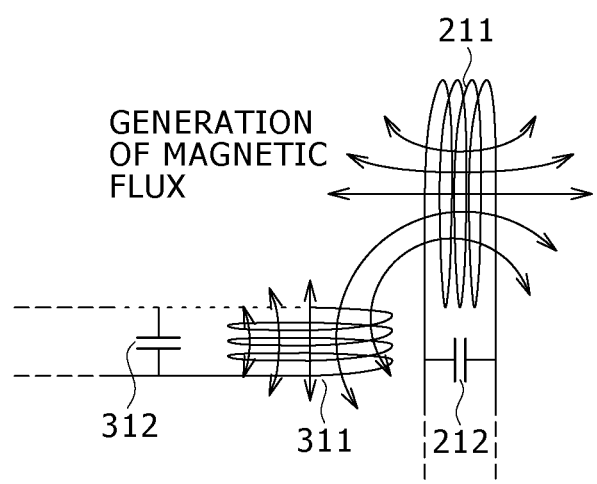
FIG. 4 is a circuit diagram schematically showing a relationship between a power transmitting side coil and a power receiving side coil in the wireless power feeding system according to the first embodiment of the present disclosure.

FIG. 4 is a circuit diagram schematically showing a relationship between a power transmitting side coil and a power receiving side coil in the wireless power feeding system according to the first embodiment of the present disclosure.

[Basic Configuration of Power Transmitting System 200 of Wireless Power Feeding Apparatus]

The power transmitting system 200 of the wireless power feeding apparatus 20 includes a power transmitting element portion 210, a filter and matching circuit 220, an amplifier 230, and a signal source 240. In this case, the signal source 240 generates a high-frequency electric power as an electric power generating portion.

The power transmitting element portion 210 is composed of a first sympathetic resonance coil (power transmitting coil) 211 as a sympathetic resonance element, and a capacitor 212. In the power transmitting element portion 210, a resonance circuit is composed of the first sympathetic resonance coil 211 and a capacitor 212.

In addition, a power feeding coil as a power feeding element may be disposed in the power transmitting element portion 210.

It is noted that although the sympathetic resonance coil is referred to as the resonance coil as well, in the first embodiment, the term of the sympathetic resonance coil is used.

When the sympathetic resonance coil 211 agrees in self-resonant frequency with a sympathetic resonance coil 311 of the power receiving system 300 of the power receiving apparatus 40, the sympathetic resonance coil 211 and the sympathetic resonance coil 311 show a magnetic field sympathetic resonance relationship. As a result, the electric power is efficiently transmitted from the power transmitting system 200 to the power receiving system 300.

The filter and matching circuit 220 has a function of impedance matching at a power feeding point of the sympathetic resonance coil 211, and thus adjusts the impedance in such a way that the electric power can be efficiently transmitted.

The amplifier 230 amplifies the electric power of an electric power signal supplied thereto from the signal source 240, and supplies the resulting electric power signal to the filter and matching circuit 220.

The signal source 240 generates a high-frequency electric power for the wireless electric power transmission.

Since the signal source 240 preferably generates the high-frequency electric power with high efficiency, a switching amplifier or the like is used as the signal source 240.

The high-frequency electric power generated in the signal source 240 is fed (applied) to the sympathetic resonance coil 211 of the power transmitting element portion 210 through the amplifier 230, and the filter and matching circuit 220.

[Basic Configuration of Power Receiving System 300 of Wireless Power Receiving Apparatus]

The power receiving system 300 of the power receiving apparatus 40 is composed of a power receiving element portion 310, a filter and matching circuit 320, a detection and rectifying circuit 330, and a regulator 340.

It is noted that the detection and rectifying circuit 330 corresponds to the rectifier 47 shown in FIG. 1, and the regulator 340 corresponds to the regulator 51 shown in FIG. 1.

The power receiving element portion 310 includes the second sympathetic resonance coil (power receiving coil) 311 as a sympathetic resonance element, and a capacitor 312. In the power receiving element portion 310, a resonance circuit is composed of the sympathetic resonance coil 311 and the capacitor 312.

The sympathetic resonance coil 311 receives an A.C. (alternating current) magnetic field to generate an electromotive force.

When the sympathetic resonance coil 311 agrees in self-resonant frequency with the sympathetic resonance coil 211 of the power transmitting system 200, the sympathetic resonance coil 311 and the sympathetic resonance coil 211 show a magnetic field sympathetic resonance relationship. As a result, the power receiving system 300 efficiently receives the electric power.

The filter and matching circuit 320 has a function of impedance matching at a connection portion (at a load end) to a load of the sympathetic resonance coil 311, and thus adjusts the impedance in such a way that the electric power can be efficiently received.

The detection and rectifying circuit 330 rectifies the A.C. electric power received therein into a D.C. electric power, and supplies the resulting D.C. electric power to the regulator (filter) 340.

The regulator 340 converts the D.C. electric power supplied thereto from the detection and rectifying circuit 330 into a D.C. voltage complying with a specification of an electronic apparatus as a supply destination, and supplies the D.C. voltage thus stabilized to the power source circuit 52. In such a way, the regulator 340 functions as a voltage stabilizing circuit.

[Basic Operation of Wireless Power Feeding]

In the wireless power feeding system 10 according to the first embodiment of the present disclosure, in the power transmitting system 200 of the power feeding apparatus 20, for example, as shown in FIG. 2, the electric power of the signal from the signal source 240 having the predetermined frequency is amplified by the amplifier 230.

Also, the electric power thus amplified is supplied to the sympathetic resonance coil (power transmitting coil) 211 through the filter and rectifying circuit 220, whereby an A.C. current is caused to flow to generate an A.C. magnetic field, thereby transmitting the electric power in the wireless manner.

On the side of the power receiving apparatus 40 as the electronic apparatus, the sympathetic resonance coil (power receiving coil) 311 of the power receiving system 300 receives the A.C. magnetic field to generate an electromotive force. Then, the electromotive force thus generated is supplied to the detection and rectifying circuit 330 through the filter and rectifying circuit 320. The detection and rectifying circuit 330 converts the A.C. current into a D.C. current, and the resulting D.C. current is then supplied to the power source circuit 52 through the regulator 340.

In such a way, in the first embodiment, on the wireless power feeding apparatus 20 side, a resonance circuit is formed by combining the sympathetic resonance coil with the capacitor, thereby carrying out the electric power transmission utilizing the magnetic field sympathetic resonance system.

As a result, when the two sympathetic resonance coils 211 and 311 are got away from each other, and as a result, the coil central axes of the two sympathetic resonance coils 211 and 311 do not agree with each other, the efficiency of the electric power transmission is not reduced so much.

As described above, in the wireless power feeding system 10, the electric power is transmitted from the power transmitting coil of the wireless power feeding apparatus 20 to the power receiving coil of the power receiving system 300 as the electronic apparatus such as a digital camera. In this case, only the wireless power feeding apparatus 20 is placed in the vicinity of the power receiving system 300 without distributing a cable, thereby making it possible to feed the electric power to the power receiving apparatus 40.

At this time, the resonance circuit is composed of the coil and the capacitor, thereby carrying out the wireless electric power transmission utilizing the magnetic field sympathetic resonance system. As a result, even if the power transmitting coil and the power receiving coil do not rightly face each other, even when as shown in FIG. 4, the power transmitting coil and the power receiving coil are located so as to make a certain angle with each other, the magnetic flux is concentrated on the power receiving coil, and thus the electric power can be transmitted with high efficiency.

As described above, the wireless power feeding system 10 is configured in such a way that "the wireless power feeding grid" and "the wireless communication grid" can be operated at the same time.

For the signal which the wireless communication grid transmits, for example, a high frequency in a GHz band or more is preferably used in order to make high-speed transfer of large-capacity contents possible.

The electric power which the wireless power feeding grid transmits is preferably transmitted at a low frequency in a MHz band or less in order to cope with the large output transmission to increase the efficiency of the rectifying circuit.

For the purpose of preventing an interference between the systems when the wireless communication grid and the wireless power feeding grid are operated simultaneously and in parallel with each other, thereby realizing the stable operation, preferably, the wireless communication grid makes the communication through an adjacent field of the electric field, and the wireless power feeding grid transmits the electric power through an adjacent field of the magnetic field.

Transfer Jet, for example, is known as the wireless communication system through the adjacent field of the electric field.

Thus, for example, the wireless power feeding system 10 is combined with Transfer Jet, thereby carrying out the power feeding and the data communication in parallel with each other, whereby seeing a moving image by using a streaming, reading an electronic book through download (or through a network), and so forth become possible.

In this case, a limitation as to when, where, and how many those become possible can be set in accordance with set information.

Although a wireless power feeding system utilizing the electromagnetic induction, and a wireless power feeding system utilizing the magnetic field sympathetic resonance are known as the wireless power feeding system through the adjacent field of the magnetic field, the first embodiment selects the latter.

As described above, the wireless power feeding system using the magnetic field sympathetic resonance phenomenon has an advantage that from the principles of the electromagnetic sympathetic resonance phenomenon, the electric power can be transmitted at an increased distance as compared with the electromagnetic induction system, and even when the axis alignment is poor a little, the transmission efficiency is not reduced so much.

The wireless power feeding system 10 of the first embodiment is configured in such a way that the magnetic field sympathetic resonance system is adopted, the axis alignment is unnecessary and the power feeding distance can be lengthened.

In the wireless power feeding system 10, the range of communication between the wireless power feeding apparatus 20 and the power receiving apparatus 40, for example, falls within the range in which the power receiving device receives the electric power transmitted thereto from the power transmitting device with the magnetic field sympathetic resonance relationship.

In the wireless power feeding system 10 having such a configuration, after the primary side wireless power feeding apparatus 20 and the secondary side power receiving apparatus 40 have carried out the authentication, the availability of the power consumption on the secondary side is controlled in accordance with the condition previously set.

With regard to a method of controlling the availability of the power consumption on the secondary side, for example, the following first to fifth methods can be adopted.

[First Method]

In the first method, after the primary side wireless power feeding apparatus 20 and the secondary side power receiving apparatus 40 have carried out the authentication, the primary side wireless power feeding apparatus 20 controls the availability of the power feeding for the operation of the electronic apparatus on the secondary side in accordance with the condition previously set. That is to say, in the first method, the primary side determines and controls whether or not the electric power should be fed.

[Second Method]

In the second method, after the primary side wireless power feeding apparatus 20 and the secondary side power receiving apparatus 40 have carried out the authentication, the secondary side power receiving apparatus 40 controls the availability of the power receiving for the operation of the electronic apparatus on the secondary side in accordance with the condition previously set. That is to say, in the second method, the secondary side determines and controls whether or not the load should be connected.

[Third Method]

In the third method, after the primary side wireless power feeding apparatus 20 and the secondary side power receiving apparatus 40 have carried out the authentication, the secondary side power receiving apparatus 40 controls the availability of activation for the operation of the electronic apparatus on the secondary side in accordance with the condition previously set. That is to say, in the third method, the secondary side determines and controls whether or not the activation should be carried out.

[Fourth Method]

In the fourth method, after the primary side wireless power feeding apparatus 20 and the secondary side power receiving apparatus 40 have carried out the authentication, the utilizable function of the electronic apparatus on the secondary side is determined in accordance with the condition previously set.

[Fifth Method]

In the fifth method, after the primary side wireless power feeding apparatus 20 and the secondary side power receiving apparatus 40 have carried out the authentication, the utilizable service of the electronic apparatus on the secondary side is determined in accordance with the condition previously set.

It is noted that an attribute (such as an ID) of the primary side, an attribute of the secondary side, usable time, and the usable number of times are contained in the condition setting described above.

The condition setting such as the attribute (such as the ID) of the primary side, the attribute of the secondary side, the usable time, and the usable number of times is carried out either in the EEPROM 24 on the primary side, or in the EEPROM 50 on the secondary side.

Also, these pieces of information are read out after completion of the authentication, thereby determining the availability of the power feeding, the availability of the activation, the availability of the utilization of the function, the availability of the utilization of the service, and the like.

Next, a description will be given with respect to examples of operations based on the first to fifth methods in the wireless power feeding system 10 described above.

Figure 5:
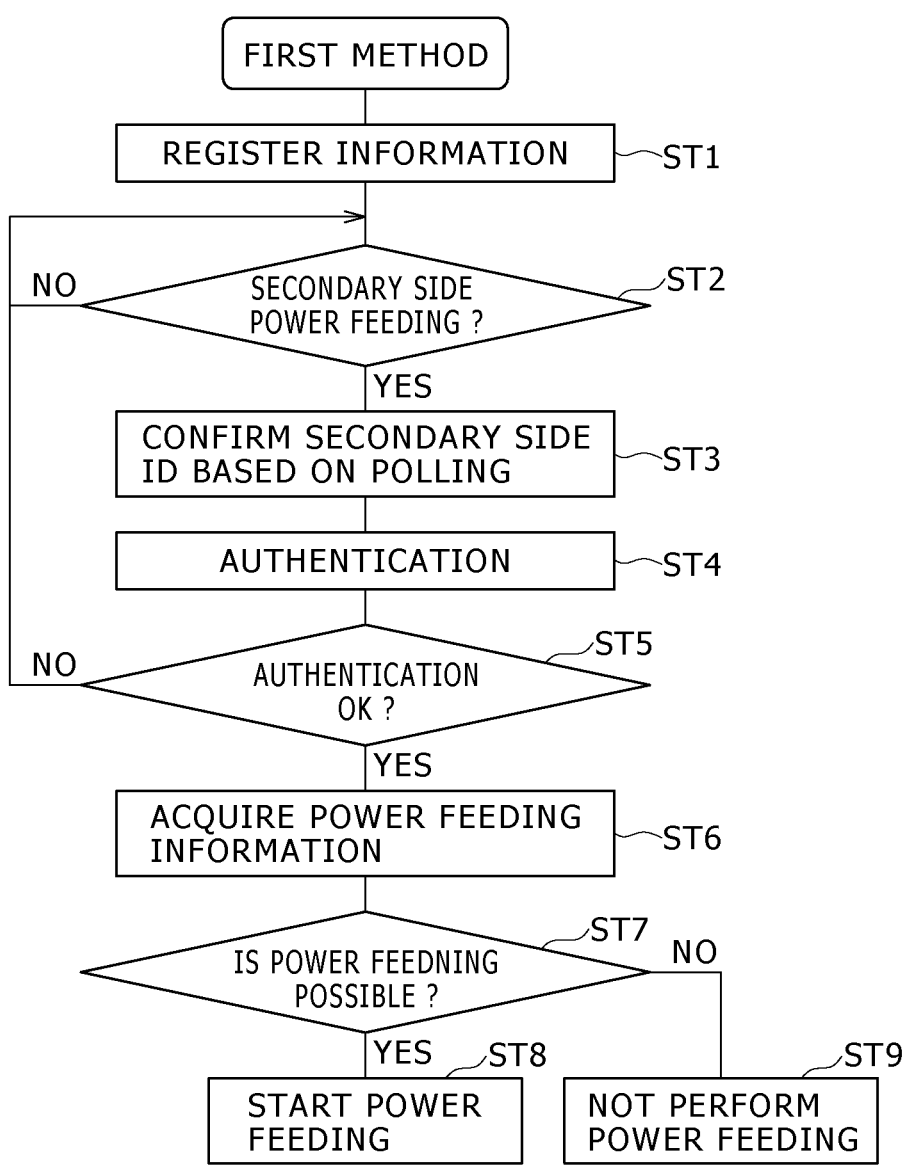
FIG. 5 is a flow chart explaining a basic operation when a first method is adopted in the wireless power feeding system according to the first embodiment of the present disclosure.

FIG. 5 is a flow chart explaining a basic operation when the first method in the wireless power feeding system 10 of the first embodiment described above is adopted.

Firstly, before start of the power feeding to the secondary side, power feeding information (information on how many hours the power feeding will be carried out, by what time the power feeding will be carried out, how many times the power feeding will be carried out, and so forth) is registered either in the server 60 or in the EEPROM 50 of the secondary side power receiving apparatus 40 in advance (ST1).

Next, when the secondary side power receiving apparatus 40 is held over (put on) the primary side wireless power feeding apparatus 20 at a distance at which the power feeding can be carried out (ST2), polling is carried out from the primary side power feeding apparatus 20 to the secondary side power receiving apparatus 40, thereby confirming the ID held on the secondary side (ST3).

Next, the authentication (either one-way authentication from the primary side to the secondary side or the mutual authentication) is carried out between the primary side wireless power feeding apparatus 20 and the secondary side power receiving apparatus 40 in accordance with the secret information stored in both the EEPROM 24 on the primary side and the EEPROM 50 on the secondary side (ST4). When the authentication is established, an operation proceeds to a subsequent processing flow (Yes; ST5).

Then, the primary side wireless power feeding apparatus 20 acquires the power feeding information (the information on how many hours the power feeding will be carried out, by what time the power feeding will be carried out, how many times the power feeding will be carried out, and so forth) which is registered either in the server 60 or in the EEPROM 50 of the secondary side power receiving apparatus 40 in advance (ST6).

After it has been confirmed that the power feeding can be carried out (ST7), the power feeding is started (ST8).

As a result, the electric power is supplied to the power source circuit 52 for a set on the secondary side, and thus use of the set main body becomes possible.

If the power feeding information does not fulfill the condition, the primary side wireless power feeding apparatus 20 does not perform the power feeding for the operation of the electronic apparatus on the secondary side (ST9), and thus it may be impossible to operate the secondary side.

As described above, since the activation of the secondary side can be limited, even if the electronic apparatus on the secondary side is stolen, it may be impossible to use the electronic apparatus thus stolen on the secondary side in any other place, which results in a protection against theft.

When the primary side wireless power feeding apparatus 20 acquires the power feeding information from the secondary side power receiving apparatus 40, for the communication for the acquisition of the power feeding information, it is preferable to encrypt the data. In this case, it is only necessary to hold a session key for such communication encryption in common in a phase of the authentication.

Figure 6:
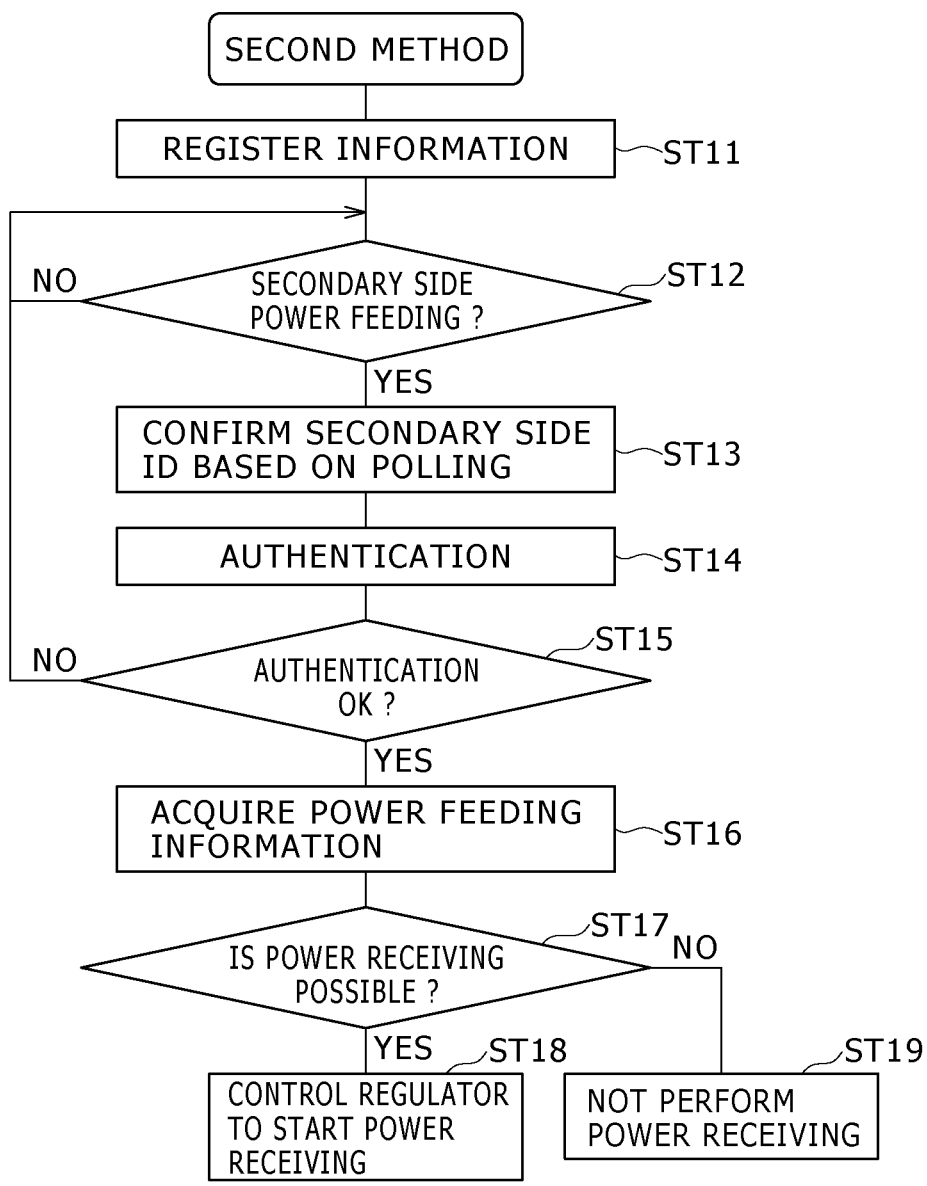
FIG. 6 is a flow chart explaining a basic operation when a second method is adopted in the wireless power feeding system according to the first embodiment of the present disclosure.

FIG. 6 is a flow chart explaining a basic operation when the second method in the wireless power feeding system 10 of the first embodiment is adopted.

Firstly, before start of the power feeding to the secondary side, the power feeding information (the information on how many hours the power feeding will be carried out, by what time the power feeding will be carried out, how many times the power feeding will be carried out, and so forth) is registered either in the server 60 or in the EEPROM 50 of the secondary side power receiving apparatus 40 in advance (ST11).

Next, when the secondary side power receiving apparatus 40 is held over (put on) the primary side wireless power feeding apparatus 20 at a distance at which the power feeding can be carried out (ST12), the polling is carried out from the primary side wireless power feeding apparatus 20 to the secondary side power receiving apparatus 40, thereby confirming the ID held on the secondary side (ST13).

Next, the authentication (either the one-way authentication from the primary side to the secondary side or the mutual authentication) is carried out between the primary side wireless power feeding apparatus 20 and the secondary side power receiving apparatus 40 in accordance with the secret information stored in both the EEPROM 24 on the primary side and the EEPROM 50 on the secondary side (ST14). When the authentication is established, an operation proceeds to a subsequent processing flow (Yes; ST15).

Then, the secondary side power receiving apparatus 40 acquires the power feeding information (the information on how many hours the power feeding will be carried out, by what time the power feeding will be carried out, how many times the power feeding will be carried out, and so forth) which is registered either in the server 60 or in the EEPROM 50 of the secondary side power receiving apparatus 40 in advance (ST16).

After it has been confirmed that the power receiving can be carried out (YES; ST17), the regulator 51 is controlled to start the power receiving (ST18). As a result, the electric power is supplied to the power source circuit 52 for a set on the secondary side, and thus use of the set main body becomes possible.

If the power feeding information does not fulfill the condition, the secondary side power receiving apparatus 40 does not carry out the power receiving for the operation of the electronic apparatus on the secondary side from the regulator 51 (ST19), and thus it may be impossible for the secondary side to operate the electronic apparatus.

As described above, since the activation of the secondary side can be limited, even if the electronic apparatus on the secondary side is stolen, it may be impossible to use the electronic apparatus thus stolen on the secondary side in any other place, which results in the protection against the theft.

When the secondary side wireless power receiving apparatus 40 acquires the power feeding information from the primary side power feeding apparatus 20, for the communication for the acquisition of the power feeding information, it is preferable to encrypt the data. In this case, it is only necessary to hold the session key for such communication encryption in common in the phase of the authentication.

Figure 7:
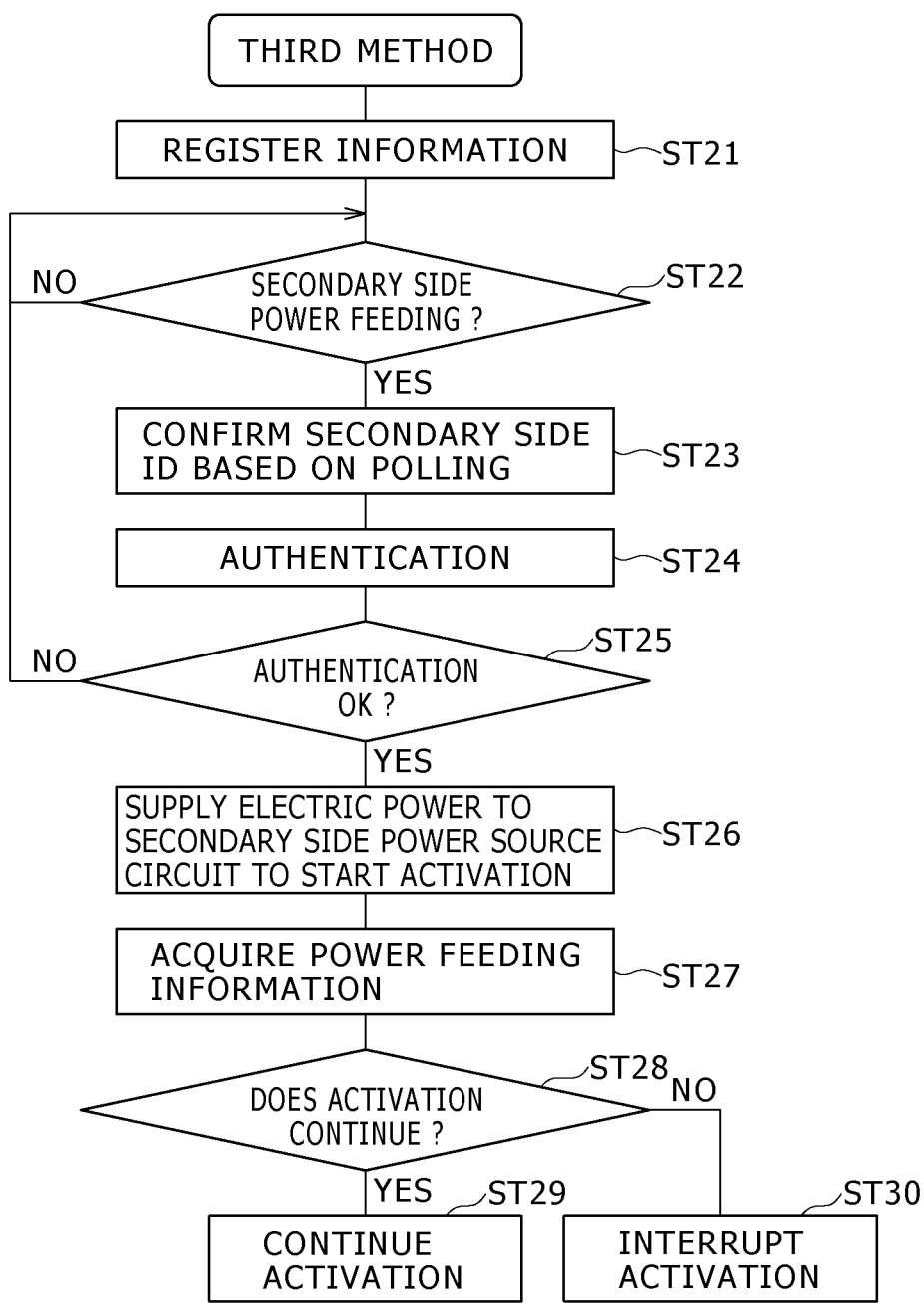
FIG. 7 is a flow chart explaining a basic operation when a third method is adopted in the wireless power feeding system according to the first embodiment of the present disclosure.

FIG. 7 is a flow chart explaining a basic operation when the third method in the wireless power feeding system 10 of the first embodiment is adopted.

Firstly, before start of the power feeding to the secondary side, the power feeding information (the information on how many hours the power feeding will be carried out, by what time the power feeding will be carried out, how many times the power feeding will be carried out, and so forth) is registered either in the server 60 or in the EEPROM 50 of the secondary side power receiving apparatus 40 in advance (ST21).

Next, when the secondary side power receiving apparatus 40 is held over (put on) the primary side wireless power feeding apparatus 20 at a distance at which the power feeding can be carried out (YES; ST22), the polling is carried out from the primary side wireless power feeding apparatus 20 to the secondary side power receiving apparatus 40, thereby confirming the ID held on the secondary side (ST23).

Next, the authentication (either the one-way authentication from the primary side to the secondary side or the mutual authentication) is carried out between the primary side wireless power feeding apparatus 20 and the secondary side power receiving apparatus 40 in accordance with the secret information stored in both the EEPROM 24 on the primary side and the EEPROM 50 on the secondary side (ST24). When the authentication is established (YES; ST25), the electric power is supplied to the power source circuit 52 for a set on the secondary side to start the activation of the electronic apparatus (product) (ST26).

In the middle of the activation, the secondary side product main body acquires the power feeding information (the information on how many hours the power feeding will be carried out, by what time the power feeding will be carried out, how many times the power feeding will be carried out, and so forth) which is registered either in the server 60 or in the EEPROM 50 of the secondary side power receiving apparatus 40 in advance (ST27), and determines whether or not the activation should be continued (ST28).

The activation is continued when the power feeding information fulfills the condition (ST29).

If the power feeding information does not fulfill the condition, the secondary side product main body interrupts the activation of the product (ST30), and thus it may be impossible for the secondary side to operate the electronic apparatus.

As described above, since the activation of the secondary side can be limited, even if the electronic apparatus on the secondary side is stolen, it may be impossible to use the electronic apparatus thus stolen on the secondary side in any other place, which results in the protection against the theft.

When the secondary side product main body acquires the power feeding information from the primary side power feeding apparatus 20, for the communication for the acquisition of the power feeding information, it is preferable to encrypt the data. In this case, it is only necessary to hold the session key for such communication encryption in common in the phase of the authentication.

Figure 8:
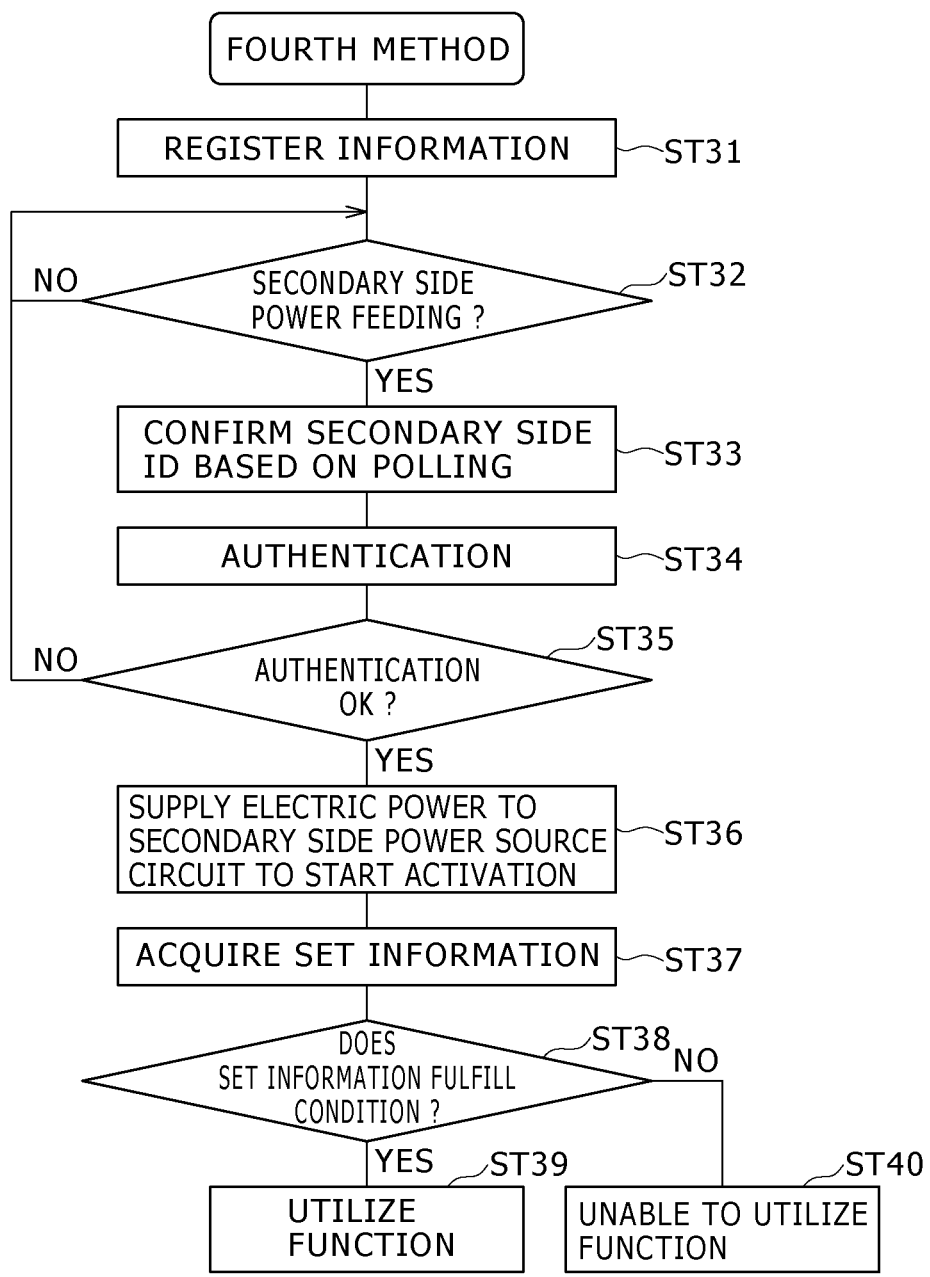
FIG. 8 is a flow chart explaining a basic operation when a fourth method is adopted in the wireless power feeding system according to the first embodiment of the present disclosure.

FIG. 8 is a flow chart explaining a basic operation when the fourth method in the wireless power feeding system 10 of the first embodiment is adopted.

Firstly, before start of the power feeding to the secondary side, the power feeding information (the information on how many hours the power feeding will be carried out, by what time the power feeding will be carried out, how many times the power feeding will be carried out, and so forth) is registered either in the server 60 or in the EEPROM 50 of the secondary side power receiving apparatus 40 in advance (ST31).

Next, when the secondary side power receiving apparatus 40 is held over (put on) the primary side wireless power feeding apparatus 20 at a distance at which the power feeding can be carried out (YES; ST32), the polling is carried out from the primary side wireless power feeding apparatus 20 to the secondary side power receiving apparatus 40, thereby confirming the ID held on the secondary side (ST33).

Next, the authentication (either the one-way authentication from the primary side to the secondary side or the mutual authentication) is carried out between the primary side wireless power feeding apparatus 20 and the secondary side power receiving apparatus 40 in accordance with the secret information stored in both the EEPROM 24 on the primary side and the EEPROM 50 on the secondary side (ST34). When the authentication is established (YES; ST35), the electric power is supplied to the power source circuit 52 for a set on the secondary side to start the activation of the electronic apparatus (product) (ST36).

Either in the middle of the activation or after completion of the activation, the secondary side product main body acquires set information (information as to which of the functions can be utilized, which of the functions cannot be utilized, and so forth) registered either in the server or in the EEPROM 50 on the secondary side in advance (ST37).

Also, when the set information fulfills the condition (YES; ST38), the function which can be utilized in the secondary side product is determined, and is utilized (ST39).

If the set information does not fulfill the condition, even when the secondary side product main body is installed as the function, it may be impossible to utilize the function (ST40).

The function which the secondary side can utilize can be limited in such a manner. When there is the function which is not wanted to be used depending on the places, the limitation as described above may be set.

When the secondary side product main body acquires the power feeding information from the primary side power feeding apparatus 20, for the communication for the acquisition of the power feeding information, it is preferable to encrypt the data. In this case, it is only necessary to hold the session key for such communication encryption in common in the phase of the authentication.

Figure 9:
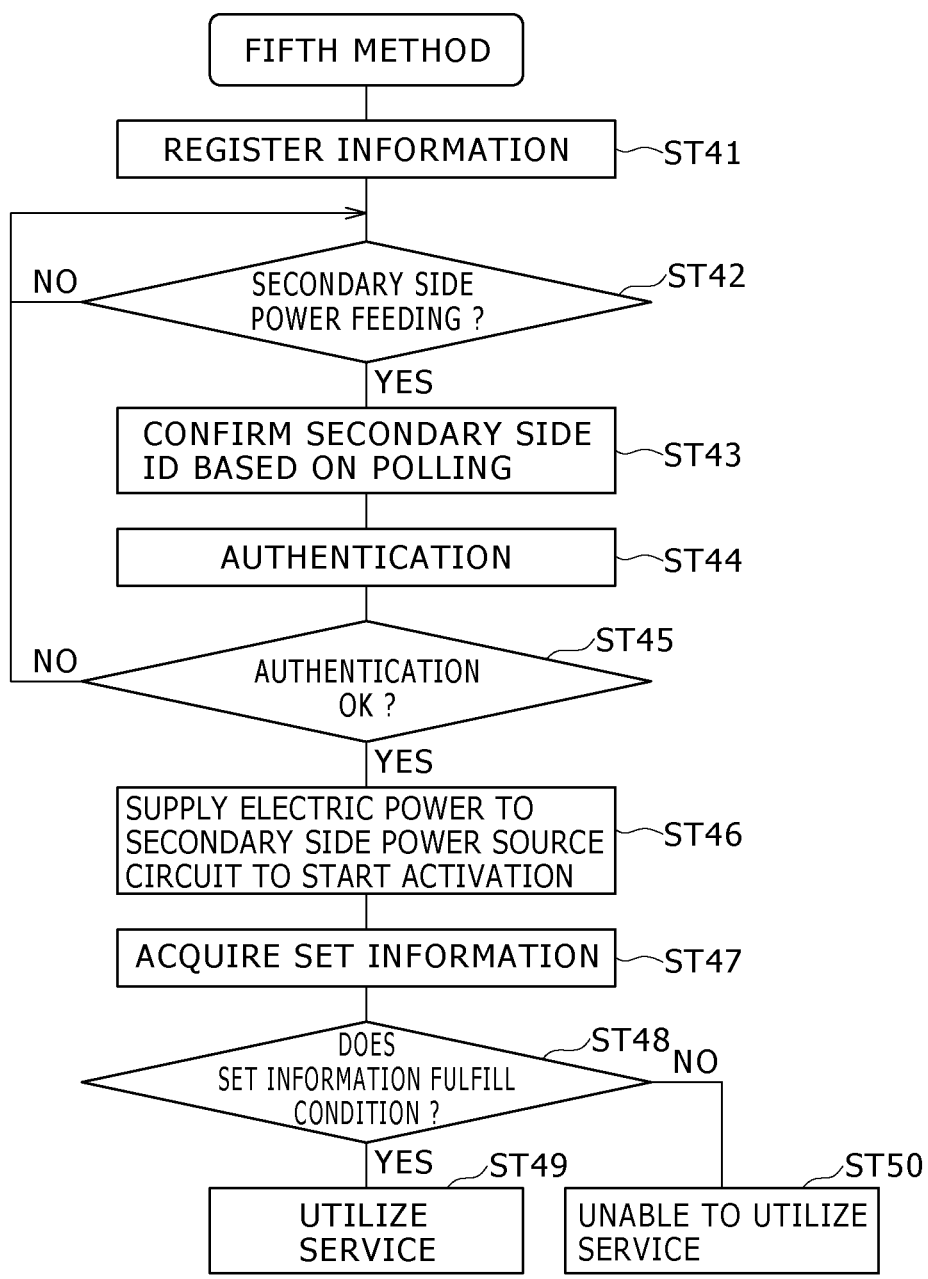
FIG. 9 is a flow chart explaining a basic operation when a fifth method is adopted in the wireless power feeding system according to the first embodiment of the present disclosure.

FIG. 9 is a flow chart explaining a basic operation when the fifth method in the wireless power feeding system 10 of the first embodiment is adopted.

Firstly, before start of the power feeding to the secondary side, the power feeding information (the information on how many hours the power feeding will be carried out, by what time the power feeding will be carried out, how many times the power feeding will be carried out, and so forth) is registered either in the server 60 or in the EEPROM 50 of the secondary side power receiving apparatus 40 in advance (ST41).

Next, when the secondary side power receiving apparatus 40 is held over (put on) the primary side wireless power feeding apparatus 20 at a distance at which the power feeding can be carried out (YES; ST42), the polling is carried out from the primary side wireless power feeding apparatus 20 to the secondary side power receiving apparatus 40, thereby confirming the ID held on the secondary side (ST43).

Next, the authentication (either the one-way authentication from the primary side to the secondary side or the mutual authentication) is carried out between the primary side wireless power feeding apparatus 20 and the secondary side power receiving apparatus 40 in accordance with the secret information stored in both the EEPROM 24 on the primary side and the EEPROM 50 on the secondary side (ST44). When the authentication is established (YES; ST45), the electric power is supplied to the power source circuit 52 for a set on the secondary side to start the activation of the electronic apparatus (product) (ST46).

Either in the middle of the activation or after completion of the activation, the secondary side product main body acquires the set information (the information as to which of the services can be utilized, which of the services cannot be utilized, and so forth) registered either in the server 60 or in the EEPROM 50 on the secondary side in advance (ST47).

Also, when the set information fulfills the condition (YES; ST48), the service which can be utilized in the secondary side product is determined, and is utilized (ST49).

If the set information does not fulfill the condition, even when the secondary side product main body is installed as the service, it may be impossible to utilize the service (ST50).

The service which the secondary side can utilize can be limited in such a manner. When there is the service which is not wanted to be used depending on the places (for example, even though there is a file which can be accessed in a company, it may be impossible to access the file from the outside of the company, and so forth), the limitation as described above may be set.

When the secondary side product main body acquires the set information from the primary side power feeding apparatus 20, for the communication for the acquisition of the set information, it is preferable to encrypt the data. In this case, it is only necessary to hold the session key for such communication encryption in common in the phase of the authentication.

In addition, the wireless power feeding system 10 of the first embodiment can execute the following first to third processing.

[First Processing]

The wireless power feeding system 10 of the first embodiment can execute the following processing as the first processing.

When the secondary side power receiving apparatus 40 is moved outside the power feeding range of the primary side wireless power feeding apparatus 20 in the middle of the power feeding, the primary side wireless power feeding apparatus 20 can detect an abrupt change in impedance of the secondary side when viewed from the primary side at the RF front end portion 29.

When such an abrupt change in impedance is detected, it is determined that the secondary side power receiving apparatus 40 is moved outside the power feeding range, the primary side wireless power feeding apparatus 20 issues a warning.

With regard to a kind of warning, there, for example, are given: (1) a warning by a sound (such as a voice or an alarm sound); (2) a warning by a light (such as error display or LED flashing); and (3) a warning by a vibration.

In addition thereto, there, for example, are given information transmission to a host system to which the primary side wireless power feeding apparatus 20 is connected, and a response on the host system side.

Moreover, there, for example, are given posting in a black list on the secondary side, rejection of connection to the secondary side, and issuance of an alarm from the host system side.

By giving such responses, it is possible to prevent the secondary side power receiving apparatus 40 from being taken out.

When such a state is provided, an administrative right is necessary for cancel release of such a state.

By the way, when the secondary side power receiving apparatus 40 is desired to be taken out without issuing any of the warnings, it is only necessary to give a response as will be described below.

Firstly, flag information used to determine whether the secondary side power receiving apparatus 40 concerned is set to a taking-out possible mode or to a taking-out impossible mode is stored in the EEPROM 50 and/or 24 on the secondary side and/or on the primary side.

Changing of the flag shall be carried out after the authentication shall have been carried out so as to be capable of being made only through either a person having the right thereof or a suitable apparatus.

Firstly, the authentication based on the techniques as will be described below is carried out for changing of the mode.

That is to say, the authentication based on "password," "biometric authentication," "administrative right," or the like is carried out for the changing of the mode.

After completion of the establishment of the authentication, the mode change becomes possible. Thus, the mode change, the setting of the taking-out destination, and the like are carried out in accordance with the setting change in the EEPROM.

With regard to the mode change, there are given the changing from "the taking-out impossible mode" to "the taking-out possible mode," and the like.

With regard to the setting of the taking-out destination, the information on the taking-out destination on the secondary side power receiving apparatus 40 concerned is set in the secondary side and/or the primary side (the reason for this is because the secondary side power receiving apparatus 40 is allowed to be used in the taking-out destination as well).

When the flag information is stored in the secondary side, the primary side wireless power feeding apparatus 20 acquires the flag information from the secondary side power receiving apparatus 40 before start of the power feeding, and stores the flag information thus acquired in the EEPROM 24, the RAM 27 or the register on the primary side.

If the flag described above is set to "the taking-out possible mode" when the primary side wireless power feeding apparatus 20 detects the abrupt impedance change described above, the primary side wireless power feeding apparatus 20 shall not issue any of the warnings. On the other hand, if the flag described above is set to "the taking-out impossible mode" when the primary side wireless power feeding apparatus 20 detects the abrupt impedance change described above, the primary side shall issue the suitable warning.

By giving the response as described above, the person having the right can move (take out) the secondary side from the primary side wireless power feeding apparatus 20 without issuing any of the warnings.

[Second Processing]

The wireless power feeding system 10 of the first embodiment can execute the following processing as the second processing.

When the secondary side power receiving apparatus 40 is moved outside the power feeding range of the primary side wireless power feeding apparatus 20 in the middle of the power feeding, the secondary side power receiving apparatus 40 can detect that the carrier sent from the primary side wireless power feeding apparatus 20 has come to be absent at the RF front end portion 45.

When the carrier has come to be unable to be detected in such a manner, it is determined that the secondary side power receiving apparatus 40 was moved outside the power feeding range, the secondary side power receiving apparatus 40 issues the suitable warning.

With regard to a kind of warning, there, for example, are given: (1) a warning by a sound (such as a voice or an alarm sound); (2) a warning by a light (such as error display or LED flashing); and (3) a warning by a vibration.

By giving such a response, it is possible to prevent the secondary side power receiving apparatus 40 from being taken out.

When such a state is provided, an administrative right is necessary for cancel release of such a state.

By the way, when the secondary side power receiving apparatus 40 is desired to be taken out without issuing any of the warnings, it is only necessary to give a response as will be described below.

Firstly, the flag information used to determine whether the secondary side power receiving apparatus 40 concerned is set to the taking-out possible mode or to the taking-out impossible mode is stored in the EEPROM 50 and/or 24 on the secondary side and/or on the primary side.

The changing of the flag shall be carried out after the authentication shall have been carried out so as to be capable of being made only through either the person having the right thereof or the suitable apparatus.

Firstly, the authentication based on the techniques as will be described below is carried out for the changing of the mode.

That is to say, the authentication based on "password," "biometric authentication," "administration right," or the like is carried out for the changing of the mode.

After completion of the establishment of the authentication, the mode change becomes possible. Thus, the mode change, the setting of the taking-out destination, and the like are carried out in accordance with the setting change in the EEPROM.

With regard to the mode change, there are given the changing from "the taking-out impossible mode" to "the taking-out possible mode," and the like.

With regard to the setting of the taking-out destination, the information on the taking-out destination on the secondary side power receiving apparatus 40 concerned is set in the secondary side and/or the primary side (the reason for this is because the secondary side power receiving apparatus 40 is allowed to be used in the taking-out destination as well).

When the flag information is stored in the primary side, the secondary side power receiving apparatus 40 acquires the flag information from the primary side wireless power feeding apparatus 20 before start of the power feeding, and stores the flag information thus acquired in the EEPROM 50, the RAM 43 or the register on the secondary side.

If the flag described above is set to "the taking-out possible mode" when the secondary side power receiving apparatus 40 detect that the carrier has come to be absent in the manner as described above, the secondary side power receiving apparatus 40 shall not issue any of the warnings. On the other hand, if the flag described above is set to "the taking-out impossible mode" when the secondary side power receiving apparatus 40 detect that the carrier has come to be absent in the manner as described above, the secondary side shall issue the warning.

By giving the response as described above, the person having the right can move (take out) the secondary side power receiving apparatus 40 from the primary side without issuing any of the warnings.

[Third Processing]

The wireless power feeding system 10 of the first embodiment can execute the following processing as the third processing.

When the secondary side power receiving apparatus 40 is improperly taken out by the person having no right as previously stated in the first processing, it is made impossible to utilize the secondary side power receiving apparatus 40 (the secondary side power receiving apparatus 40 is locked).

For example, as previously stated in the first processing, when it is detected on the primary side wireless power feeding apparatus 20 that the secondary side power receiving apparatus 40 has been improperly taken out, information on the improper taking-out of the secondary side is stored either in the memory device (such as the EEPROM 24, the RAM 27 or the register) on the primary side, or in the memory device of the host system to which the primary side is connected.

When the secondary side power receiving apparatus 40 thus improperly taken out is held over the primary side wireless power feeding apparatus 20, the primary side wireless power feeding apparatus 20 compares the stored information, and the ID or the like on the secondary side power receiving apparatus 40 with each other, and thus can determine that the secondary side power receiving apparatus 40 was improperly taken out in the past.

In this case, the primary side power feeding apparatus 20 gives the following response, thereby making it impossible to utilize the secondary side power receiving apparatus 40 improperly taken out.

The power feeding for the operation of the product is not carried out for the secondary side power receiving apparatus 40.

Such predetermined pieces of setting information as to make it impossible to activate the secondary side power receiving apparatus 40 are written to the memory device (such as the EEPROM 50, the RAM 43 or the register) on the second side. The secondary side power receiving apparatus 40 refers to the predetermined pieces of setting information in a phase of the activation thereof, thereby stopping the activation.

When such a state is provided, an administrative right is necessary for the cancel release of such a state.

When the secondary side power receiving apparatus 40 is improperly taken out by the person having no right as previously stated in the second processing, it is made impossible to utilize the secondary side power receiving apparatus 40 (the secondary side power receiving apparatus 40 is locked).

For example, as previously stated in the second processing, when it is detected on the secondary side power receiving apparatus 40 that the secondary side power receiving apparatus 40 has been improperly taken out, the information on the improper taking-out of the secondary side is stored in the memory device (such as the EEPROM 50, the RAM 43 or the register) on the secondary side.

When the secondary side power receiving apparatus 40 thus improperly taken out is held over the primary side wireless power feeding apparatus 20, the primary side wireless power feeding apparatus 20 confirms the information stored in the secondary side power receiving apparatus 40, and thus can determine that the secondary side power receiving apparatus 40 was improperly taken out in the past.

In this case, the primary side wireless power feeding apparatus 20 gives the following response, thereby making it impossible to utilize the secondary side power receiving apparatus 40 improperly taken out.

The power feeding for the operation of the product is not carried out for the secondary side power receiving apparatus 40.

Such predetermined pieces of setting information as to make it impossible to activate the secondary side power receiving apparatus 40 are written to the memory device (such as the EEPROM 50, the RAM 43 or the register) on the second side. The secondary side power receiving apparatus 40 refers to the predetermined pieces of setting information in the phase of the activation thereof, thereby stopping the activation.

Or, when the secondary side power receiving apparatus 40 which was improperly taken out is held over the primary side wireless power feeding apparatus 20, the secondary side power receiving apparatus 40 confirms the information stored in the phase of the activation thereof, and thus confirms whether or not the secondary side power receiving apparatus 40 was improperly taken out in the past.

If it is confirmed that the secondary side power receiving apparatus 40 was improperly taken out in the past, it can be made impossible to utilize the secondary side power receiving apparatus 40 improperly taken out by giving the following responses.

The secondary side power receiving apparatus 40 does not carry out the power feeding for the operation of the product.

The secondary side power receiving apparatus 40 stops the activation thereof at a time point when it can be confirmed that the secondary side power receiving apparatus 40 was improperly taken out in the past.

When such a state is provided, the administrative right is necessary for the cancel release of such a state.

2. Second Embodiment

Figure 10:
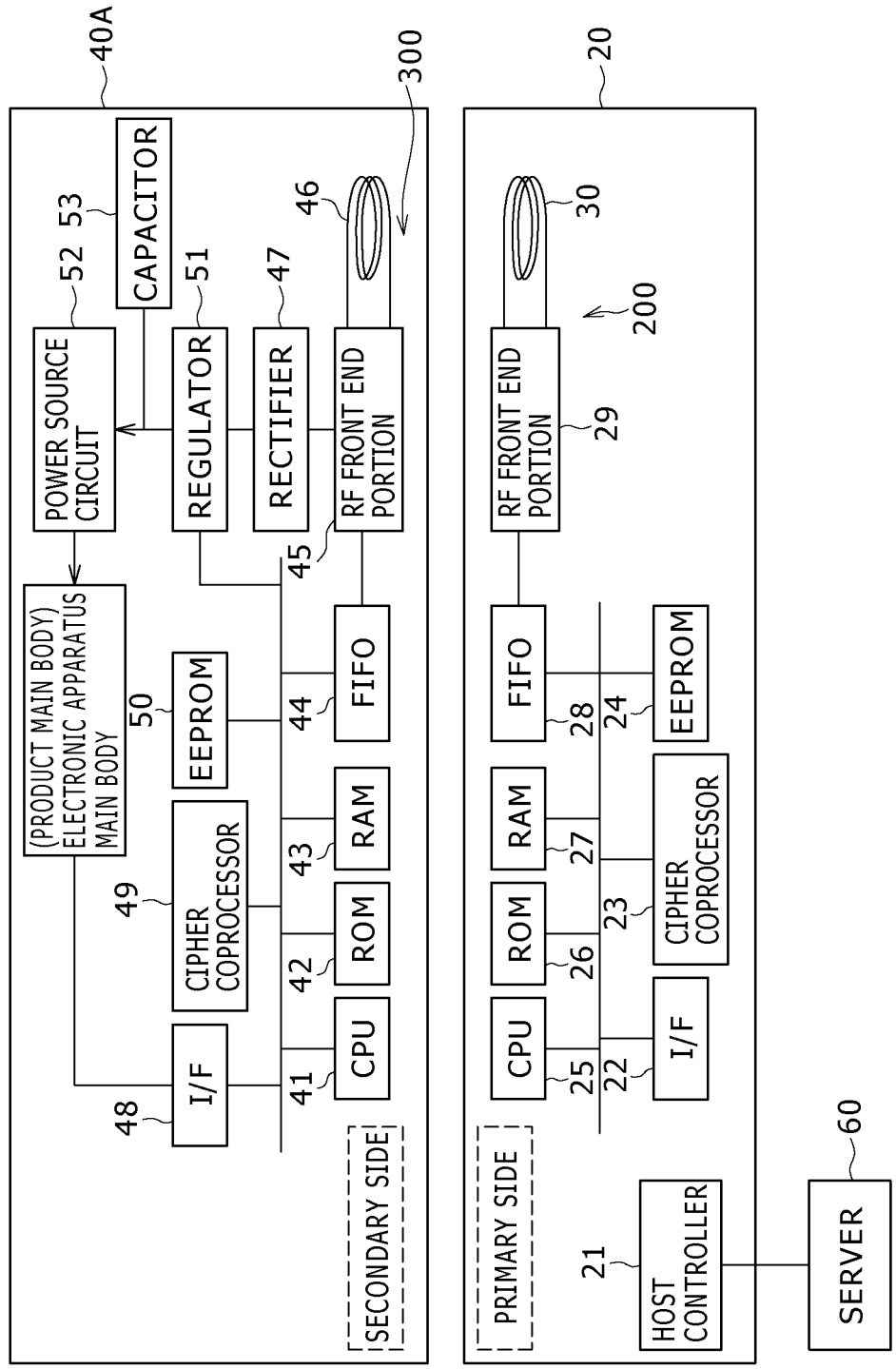
FIG. 10 is a block diagram showing a configuration of a wireless power feeding system according to a second embodiment of the present disclosure.

FIG. 10 is a block diagram showing a configuration of a wireless power feeding system according to a second embodiment of the present disclosure.

A wireless power feeding system 10A of the second embodiment is different from the wireless power feeding system 10 of the first embodiment in that in order to cope with instantaneous interruption of the power feeding, a capacitor 53 having a large capacity is disposed in a secondary side power receiving apparatus 40A.

In such a way, in the second embodiment, the large-capacity capacitor 53 for storage is disposed on an output side of the regulator 51 of the secondary side power receiving apparatus 40A.

As a result, even when a noise is contained in an output signal from the regulator 51 due to some sort of cause, an influence can be prevented from being exerted on the operation of the product.

3. Third Embodiment

Figure 11:
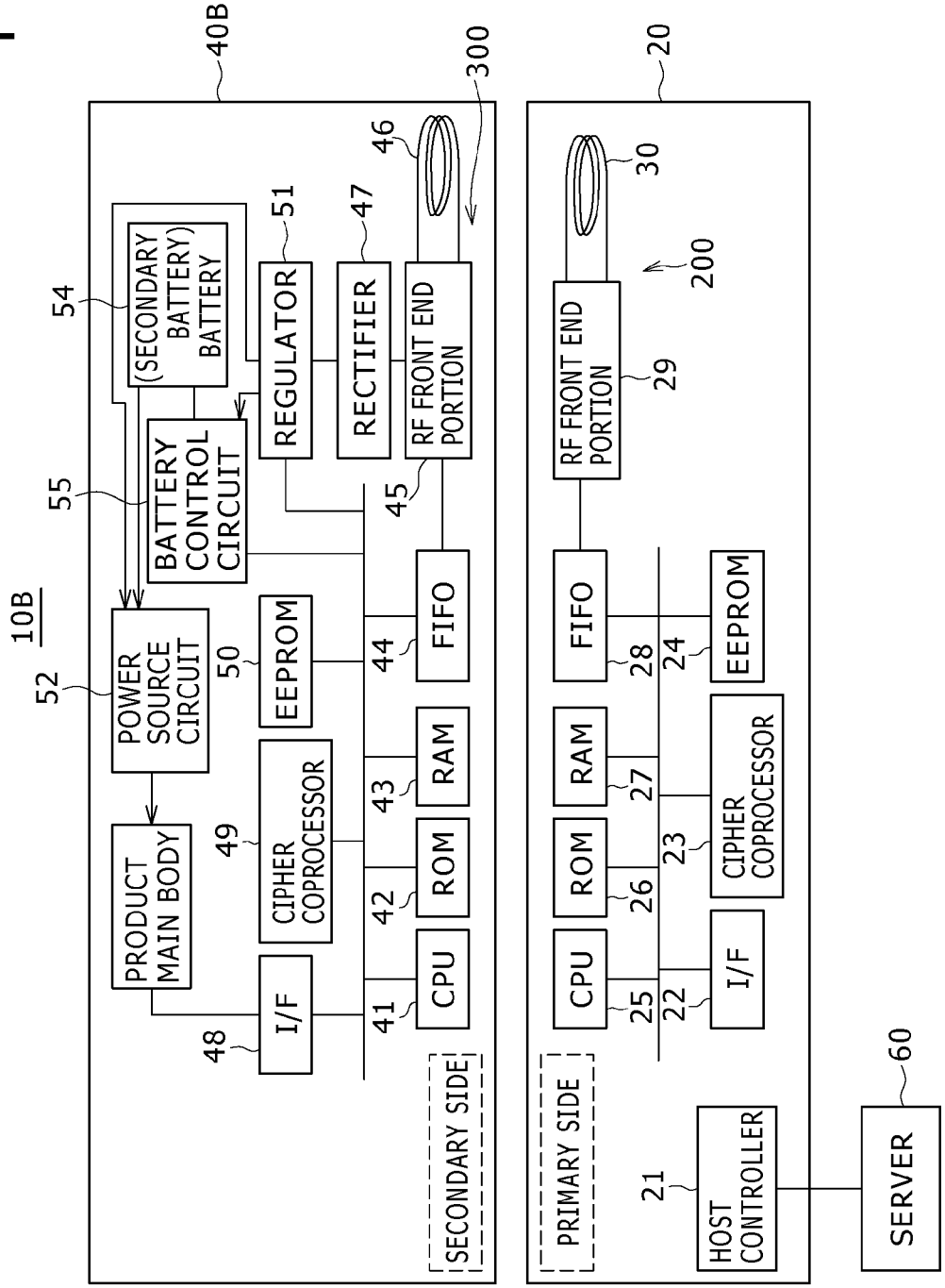
FIG. 11 is a block diagram showing a configuration of a wireless power feeding system according to a third embodiment of the present disclosure.

FIG. 11 is a block diagram showing a configuration of a wireless power feeding system according to a third embodiment of the present disclosure.

A point of difference of a wireless power feeding system 10B of the third embodiment from the wireless power feeding system 10 of the first embodiment is as follows.

A battery 54 and a battery control circuit 55 are disposed in a secondary side power receiving apparatus 40B, whereby a path for direct supply from the regulator 51 to the power source circuit 52, and a path for supply from the battery 54 are both formed.

In the third embodiment, both a path from the battery 54 installed on the secondary side, and a path from the regulator 51 owing to the wireless power feeding exist in the power source circuit 52 on the secondary side.

By the way, a path for the power feeding to the battery 54 reaching the battery 54 through from the regulator 51 to the battery control circuit 55 also exists.

Normally, the electric power is supplied through the path from the battery 54. However, when the secondary side power receiving apparatus 40B is held over the primary side carrier, the path for the electric power supply from the secondary side battery 54 is interrupted, and thus the path from the regulator 51 owing to the wireless power feeding is set as being valid.

After that, similarly to the case of the first method in the first embodiment, after the primary side and the secondary side carry out the authentication, the primary side controls the availability of the power feeding for the operation of the secondary side product in accordance with the condition previously set, thereby making it possible to control (limit) the operation on the secondary side.

In addition, similarly to the case of the second method in the first embodiment, after the primary side and the secondary side carry out the authentication, the secondary side controls the availability of the power receiving for the operation of the secondary side product in accordance with the condition previously set, thereby making it possible to control (limit) the operation on the secondary side.

In addition, similarly to the case of the third method in the first embodiment, since the secondary side controls whether or not the activation should be carried out in accordance with the result of the authentication carried out by the primary side and the secondary side, and the various kinds of set conditions, the electric power may be supplied from the battery 54, or may be supplied in the wireless manner.

In addition, similarly to the case of the fourth method in the first embodiment, since the utilizable function on the secondary side is controlled in accordance with the result of the authentication carried out by the primary side and the secondary side, and the various kinds of set conditions, the electric power may be supplied from the battery 54, or may be supplied in the wireless manner.

Also, similarly to the case of the fifth method in the first embodiment, since the utilizable service on the secondary side is controlled in accordance with the result of the authentication carried out by the primary side and the secondary side, and the various kinds of set conditions, the electric power may be supplied from the battery 54, or may be supplied in the wireless manner.

The utilizable function can also be changed between the case where the electric power is supplied from the battery 54, and the case where the electric power is fed in the wireless manner on the secondary side.

4. Fourth Embodiment

Figure 12:
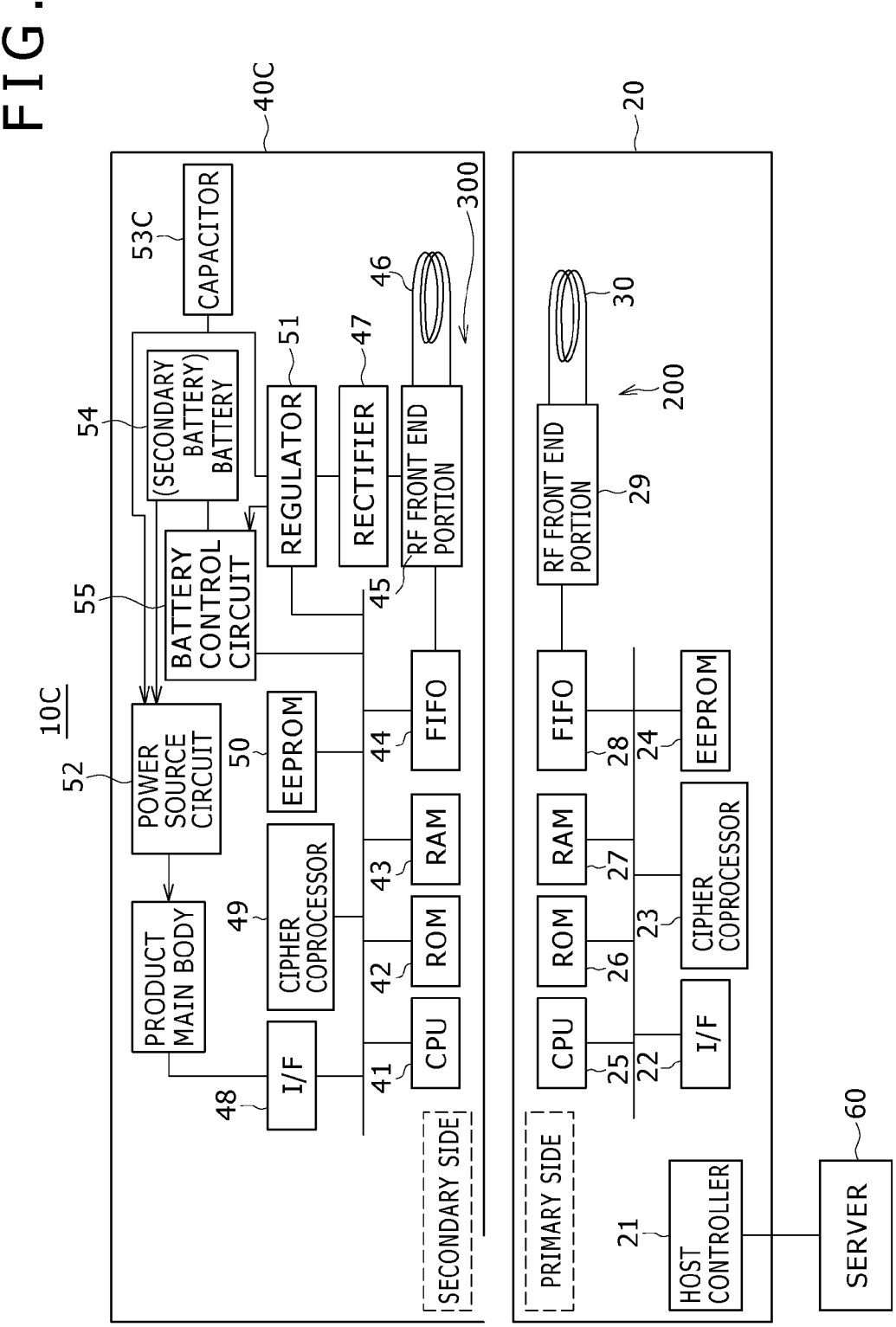
FIG. 12 is a block diagram showing a configuration of a wireless power feeding system according to a fourth embodiment of the present disclosure.

FIG. 12 is a block diagram showing a configuration of a wireless power feeding system according to a fourth embodiment of the present disclosure.

A wireless power feeding system 10C of the fourth embodiment is different from the wireless power feeding system 10B of the third embodiment in that in order to cope with the instantaneous interruption of the power feeding, a capacitor 53C having a large capacity is disposed in a secondary side power receiving apparatus 40C.

In such a way, in the fourth embodiment, similarly to the case of the second embodiment, the large-capacity capacitor 53C for storage is disposed on an output side of the regulator 51 of the secondary side power receiving apparatus 40C.

As a result, even when a noise is contained in an output signal from the regulator 51 due to some sort of cause, an influence can be prevented from being exerted on the operation of the product.

5. Fifth Embodiment

Figure 13:
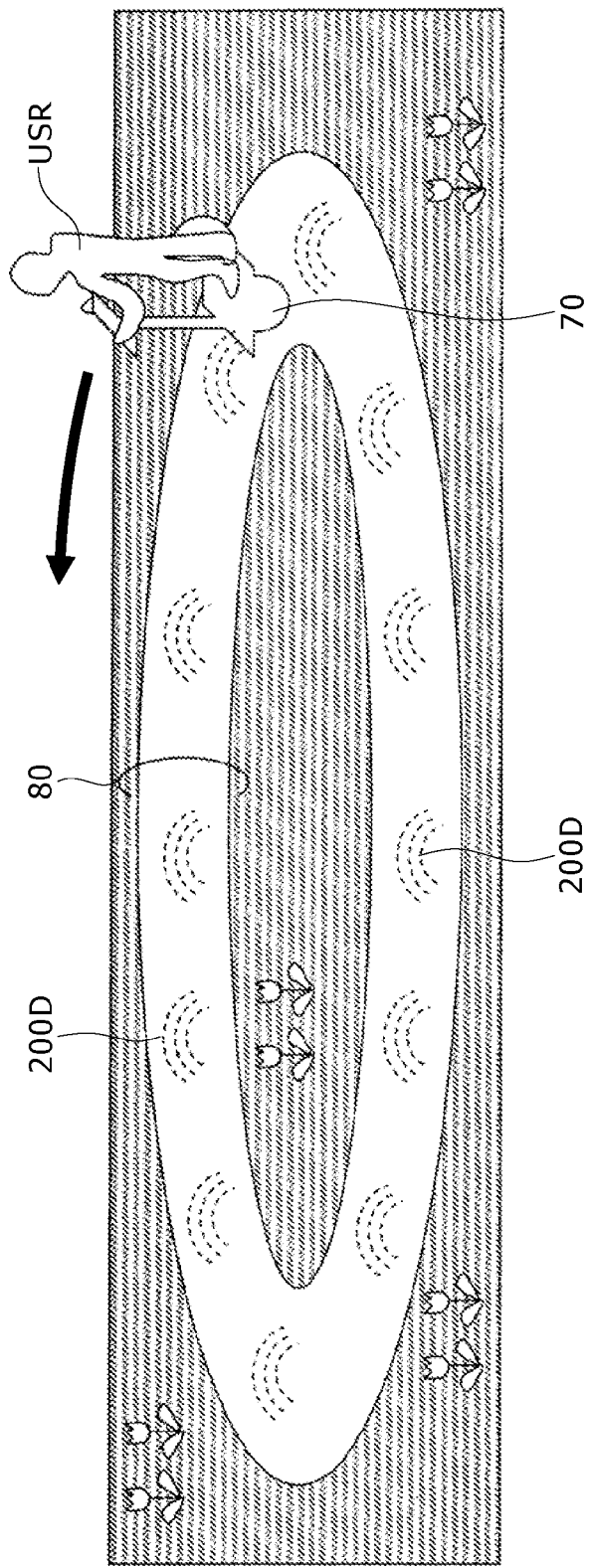
FIG. 13 is a view explaining an outline of a wireless power feeding system according to a fifth embodiment of the present disclosure.

FIG. 13 is a view explaining an outline of a wireless power feeding system according to a fifth embodiment of the present disclosure.

A wireless power feeding system 10D of the fifth embodiment shows a system in which a secondary side product main body can be utilized only within a specified area.

The wireless power feeding system 10D of the fifth embodiment is configured in such a way that in an amusement park, a recreation field or the like, an electric cart 70 as the secondary side apparatus which a user USR can get on can pass through only a specified road 80.

Specifically, power transmission systems 200D including power transmitting coils on the primary side, for example, are disposed at predetermined intervals so as to be embedded in the road 80 and so as not to interrupt the electric power feeding. Each of the power transmission systems 200D, for example, is embedded at the central portion of the road 80.

In this case, a value which is enough to operate an apparatus of the secondary side power receiving apparatus, including a width direction of the road 80 is set for the transmission electric power of each of the transmission systems 200D.

For the control for the drive of each of the power transmitting systems 200D, it is possible to adopt various kinds of forms: (1) the primary side wireless power feeding apparatus 20 is provided every power transmitting system 200D; and (2) the CPUs 25 are allocated to the power transmitting systems 200D, correspondingly, and the host controller 21 generally controls the CPUs 25.

In the fifth embodiment, the configurations and functions which were described in the first to fourth embodiments in detail can be suitably combined with one another to be applied thereto.

According to the fifth embodiment, the place where the cart 70 as the electronic apparatus on the power receiving side can be specified or limited within the range of the road 80 previously regulated.

6. Sixth Embodiment

Figure 14:
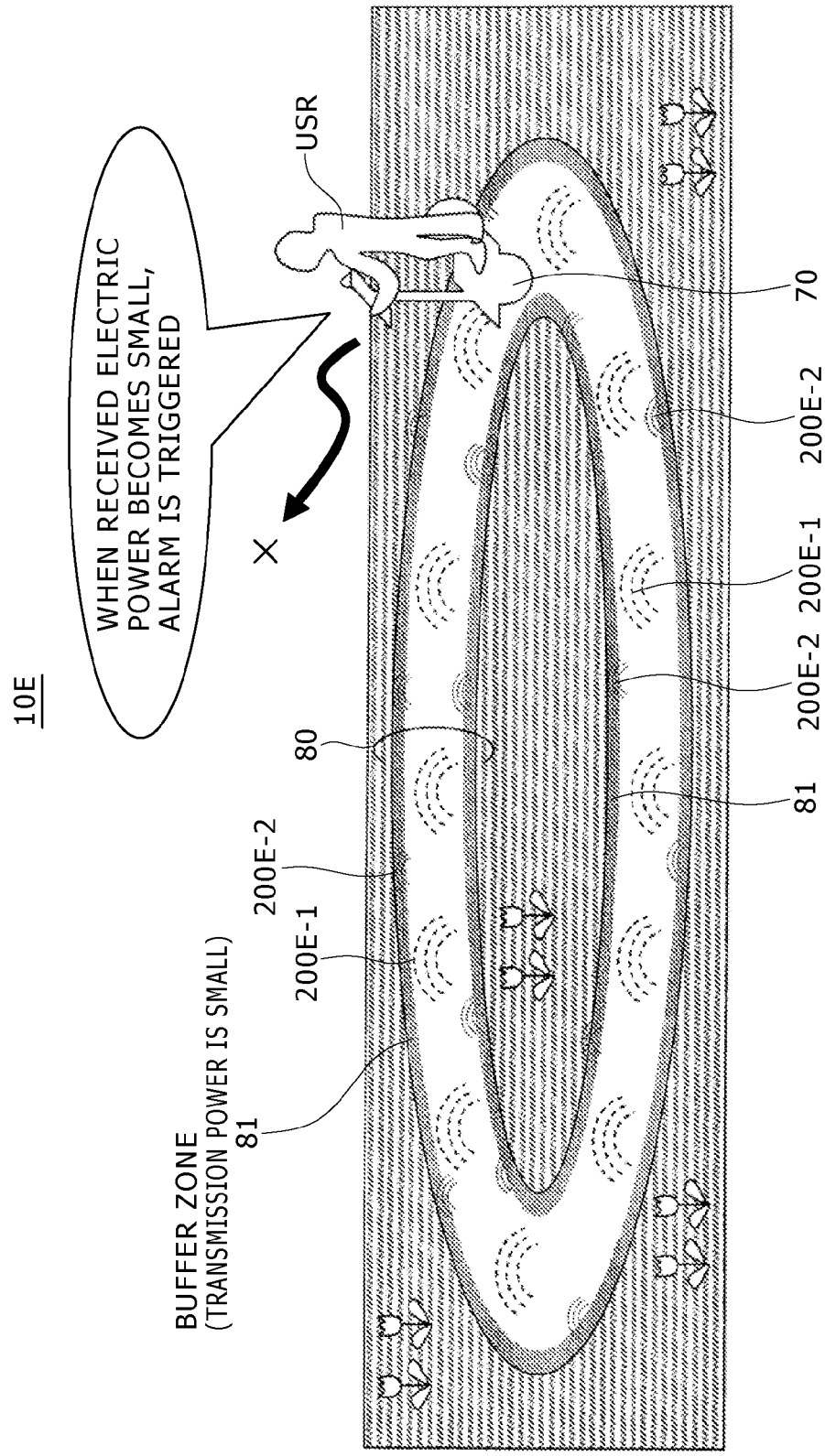
FIG. 14 is a view explaining an outline of a wireless power feeding system according to a sixth embodiment of the present disclosure.

FIG. 14 is a view explaining an outline of a wireless power feeding system according to a sixth embodiment of the present disclosure.

Points of difference of the wireless power feeding system 10E of the sixth embodiment from the wireless power feeding system 10D of the fifth embodiment are as follows.

In the wireless power feeding system 10D of the fifth embodiment, plural first power transmitting systems 200D are each embedded at the central position of the road 80.

The wireless power feeding system 10E of the sixth embodiment is configured in such a way that buffer zones in which the second power transmitting systems are embedded are further provided on edge portion sides of the road 80 and thus the electric power supplied to the power receiving side is prevented from being suddenly interrupted due to a change in position of the cart 70 as the secondary side apparatus.

Also, the wireless power feeding system 10E of the sixth embodiment is configured in such a way that the secondary side power receiving apparatus 40 informs the user USR of the level of the fed electric power.

Figure 15:
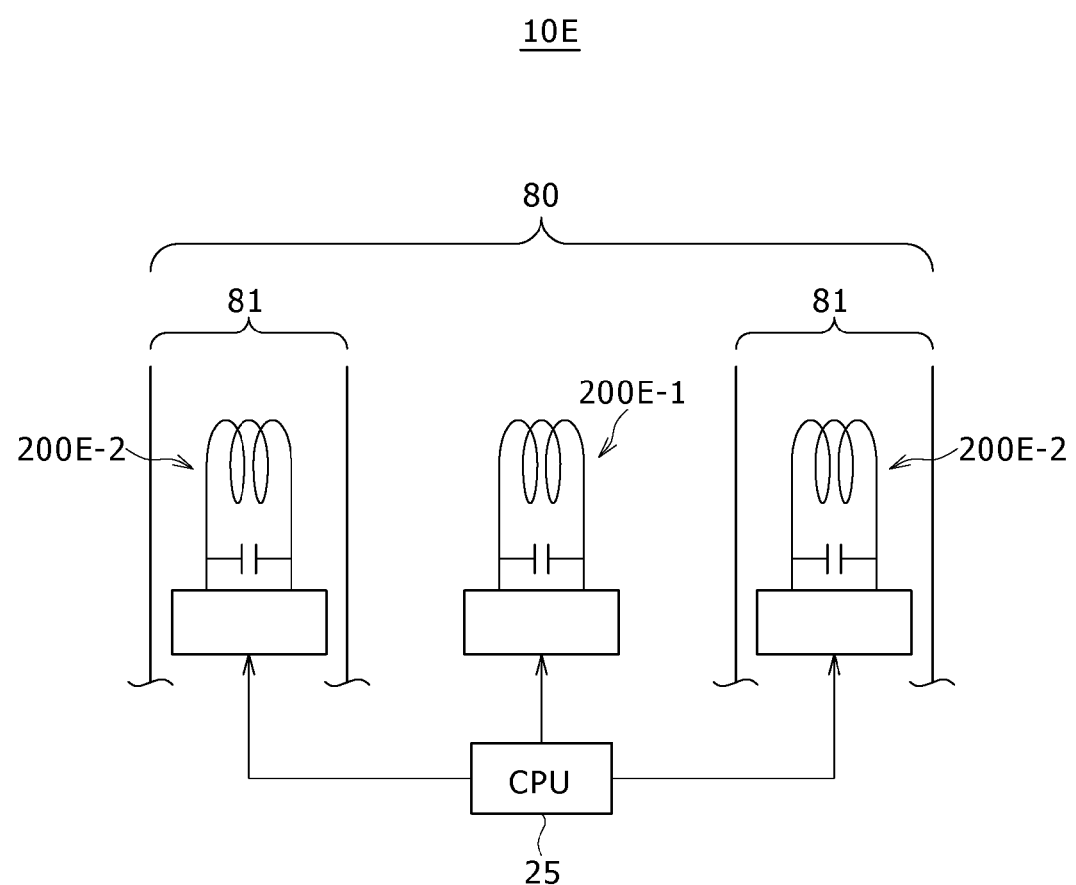
FIG. 15 is a view explaining an outline explaining an example of disposition of a power transmitting system on a power transmitting side in the wireless power feeding system according to the sixth embodiment of the present disclosure.

FIG. 15 is a circuit diagram showing an example of disposition of a power transmitting system in a road in the wireless power feeding system according to the sixth embodiment of the present disclosure.

In the wireless power feeding system 10E, as shown in FIGS. 14 and 15, similarly to the case of the fifth embodiment, first power transmitting systems 200E-1 each having a high transmission electric power are disposed at the central portion of the road 80.

Also, in the wireless power feeding system 10E, buffer zones 81 are provided so as for each of them to have a predetermined width on edge portion sides of the road 80 as a boundary of an area used. Second power transmitting systems 200E-2 each having a lower transmission electric power than that of each of the first power transmitting systems 200E-1 are disposed in the buffer zones 81.

In this case as well, for the control for the drive of the first and second power transmitting systems 200E-1 and 200E-2, it is possible to adopt various kinds of forms: (1) the primary side wireless power feeding apparatus 20 is provided every transmission systems 200E; and (2) the CPUs 25 are allocated to the transmission power systems 200E and the host controller 21 generally controls the CPUs 25.

FIG. 15 shows a configuration in which one CPU 25 controls both the first power transmitting systems 200E-1, and the second power transmitting systems 200E-2 disposed in the buffer zones 81 disposed on both sides of the first power transmitting systems 200E-1.

Here, the reason why the buffer zone is provided will be described.

As previously stated, the wireless power feeding adopts the system in which the electric power is transmitted by utilizing either the electromagnetic induction or the magnetic field sympathetic resonance.

It is known that the intensity of the magnetic field generated by the electromagnetic induction attenuates in inverse proportion to the cube of a distance, and the intensity of the magnetic field generated by the magnetic field sympathetic resonance attenuates in inverse proportion to the square of a distance.

In both the cases, the intensity of the magnetic field abruptly attenuates with the increasing distance. Therefore, it is thought that when the number of coils for power transmission is just one in a certain position, a curve of the attenuation is steep, so that the buffer zone is hardly formed, and thus the electric power supplied to the power receiving side is suddenly interrupted due to a slight change in position.

In order to cope with a situation, in the wireless power feeding system 10E of the sixth embodiment, the buffer zones 81 are provided on the both side edge portions of the road 80 and plural power transmitting systems 200E-1 and 200E-2 including the coils for the power transmission are disposed in the width direction in certain positions.

Also, in the wireless power feeding system 10E, the electric power transmission output from the first power transmitting system 200E-1 (coil) located close to the center of the wireless power feeding area is made large.

In addition, in the wireless power feeding system 10E, the electric power transmission output from the second power transmitting system 200E-2 disposed outside the first power transmitting system 200E-1 is made small, and is made to have the value enough to operate the apparatus on the power receiving side.

In such a way, in the wireless power feeding system 10E, there is realized the buffer zones 81 each having the width enough to allow the user carrying the mobile terminal on the power receiving side to perceive and respond the change in intensity of the magnetic field (for example, allow the user to move to a position again to which the intensity of the magnetic field is closer).

Figure 16:
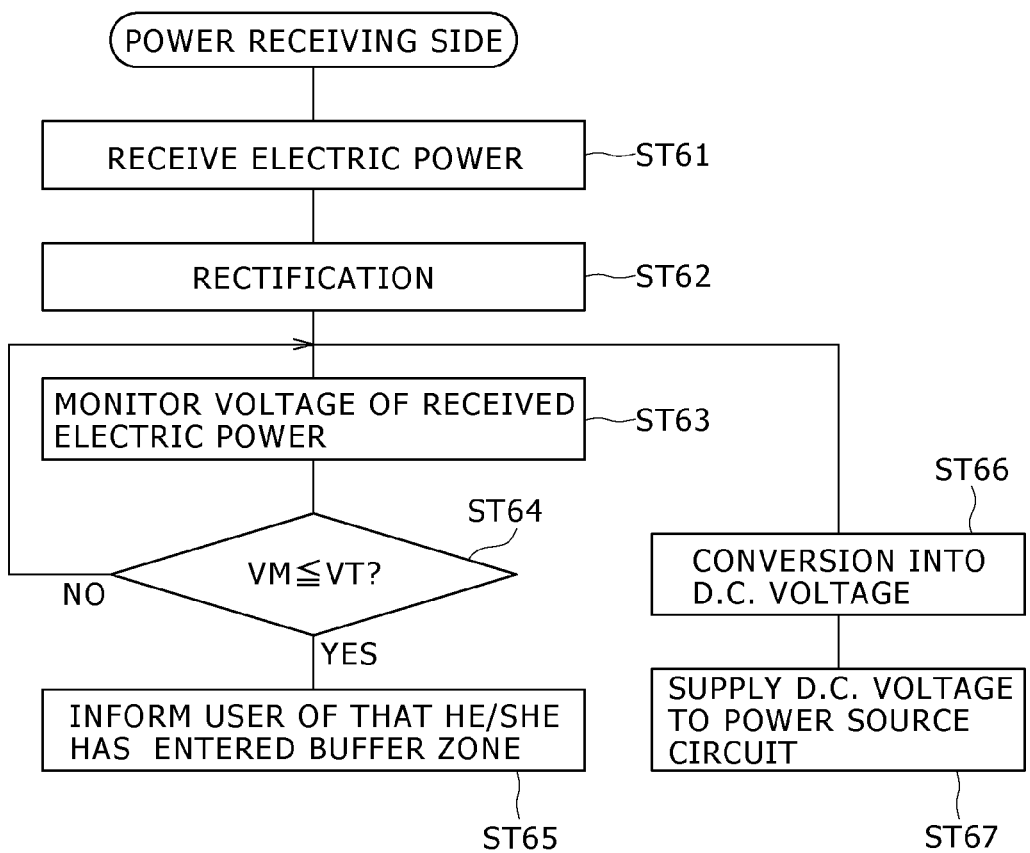
FIG. 16 is a flow chart showing a monitoring control processing for a received electric power on a power receiving side in the wireless power feeding system according to the sixth embodiment of the present disclosure.

FIG. 16 is a flow chart showing monitoring control processing for the received electric power on the power receiving side of the wireless power feeding system of the sixth embodiment.

When the electric power has been received in the power receiving side apparatus (ST61), the electric power thus received is rectified by the rectifier 47 (ST62), and the voltage of the electric power obtained through the rectification in the rectifier 47 is monitored (ST63).

Here, when a monitored voltage VM has become equal to or lower than a given voltage VT previously set (YES: ST64), the user is informed of that he/she has entered the buffer zone, in a word, that when he/she moves to the outside a little or more, the power source will be turned OFF in the manner as will be described below (ST65).

Specifically, in the power receiving apparatus, for example, a message is displayed on a display device, an LED is flashed, or the apparatus main body is vibrated by a vibrator, whereby the user is informed of that he/she has entered the buffer zone, in a word, that when he/she moves to the outside a little or more, the power source will be turned OFF.

It is noted that after the electric power thus received has been rectified, the resulting electric power is made to turn into a given voltage in the regulator 51 and is then supplied to the power source circuit 52 of the apparatus (ST66 and ST67).

According to the sixth embodiment, the user can be previously guided so that he/she is located within the specified (limited) area as well as the place where the cart 70 as the power receiving side electric apparatus can be specified or limited within the range of the road 80 previously regulated.

In addition to the foregoing, the following cases can be exemplified as examples in each of which the place where the secondary side apparatus is used is specified or limited within the range previously regulated.

There are given an example in which an electronic display terminal can be utilized only in a browse area, an example in which an electronic book terminal can be read only on a desk specified within a library, and an example in which an electronic catalog can be browsed only in a place specified within a store.

In addition, there are given an example of a work comment in which an electronic terminal is displayed only in a place close to a work in an art museum, and an example in which a mobile phone can be utilized only in a specified phone area.

As has been described so far, according to the embodiments of the present disclosure, the following effects can be obtained.

In the wireless power feeding system, the electric power is not fed to the secondary side unless the authentication between the primary side and the secondary side is established and it is determined that the power feeding can be carried out in accordance with the power feeding information previously registered. Therefore, in the place where the predetermined primary side exists, only the secondary side having the right of being fed with the electric power can be used.

Thus, even when a person having an ill will takes out the secondary side product, it may be impossible for he/she to use the product concerned, which results in the protection against the theft.

In addition, since the electric power is supplied in the wireless manner, it is unnecessary to mount the large-capacity battery on the secondary side. Therefore, it is possible to realize the weight saving and the miniaturization of the set of the secondary side.

By utilizing such a wireless power feeding system, the following processing becomes possible.

It becomes possible to realize an e-Book which can be used only in a predetermined library, a mobile terminal which can be used only in a predetermined air plane or train and only for a predetermined period of time, a cart which can be used only in a predetermined amusement park or shopping center, and the like.

The present application contains subject matter related to that disclosed in Japanese Priority Patent Application JP 2010-248243 filed in the Japan Patent Office on Nov. 5, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A wireless power feeding method, comprising:
   transmitting, by a first antenna of a power feeding apparatus, an electric power for wireless power feeding;
   carrying out, by the first antenna of the power feeding apparatus, wireless communication;
   receiving, by a power receiving apparatus, the electric power fed thereto from said power feeding apparatus;
   communicating, by a second antenna of the power receiving apparatus, with said first antenna in a wireless manner; and
   controlling, by one or more central processing units of one of said power feeding apparatus and said power receiving apparatus, availability of power consumption in said power receiving apparatus as a secondary side, wherein said availability of power consumption is controlled in accordance with a condition previously set, after said power feeding apparatus and said power receiving apparatus carry out authentication of the power receiving apparatus, wherein said power receiving apparatus serves to feed the electric power thus received to a power source circuit, wherein
   the controlling comprises determining, by the one or more central processing units of said power receiving apparatus, a file which is accessible by an electronic apparatus on the secondary side, wherein said file is determined in accordance with the condition previously set, after said power feeding apparatus and said power receiving apparatus carry out the authentication.

2. The wireless power feeding method according to claim 1, wherein
   the controlling comprises controlling, by the one or more central processing units of said power feeding apparatus, availability of power feeding for an operation of an electronic apparatus of said power receiving apparatus as the secondary side, wherein said availability of power feeding is controlled in accordance with the condition previously set, after said power feeding apparatus and said power receiving apparatus carry out the authentication.

3. The wireless power feeding method according to claim 1, wherein
the controlling comprises controlling, by the one or more central processing units of said power feeding apparatus, availability of power reception for an operation of an electronic apparatus of said power receiving apparatus on the secondary side, wherein said availability of power reception is controlled in accordance with the condition previously set, after said power feeding apparatus and said power receiving apparatus carry out the authentication.

4. The wireless power feeding method according to claim 1, wherein
the controlling comprises controlling, by the one or more central processing units of said power receiving apparatus, activation of an electronic apparatus of said power receiving apparatus on the secondary side, wherein said activation is controlled in accordance with the condition previously set, after said power feeding apparatus and said power receiving apparatus carry out the authentication.

5. The wireless power feeding method according to claim 1, wherein
the controlling comprises limiting, by the one or more central processing units of said power receiving apparatus, an operation of an electronic apparatus on the secondary side, wherein said operation is limited in accordance with the condition previously set, after said power feeding apparatus and said power receiving apparatus carry out the authentication.

6. The wireless power feeding method according to claim 1, wherein
the condition previously set comprises an identification (ID) of said power feeding apparatus as a primary side, an identification (ID) of said power receiving apparatus as the secondary side, available time for the power consumption, and available number of times for the power consumption.

7. The wireless power feeding method according to claim 1, wherein
said power feeding apparatus and said power receiving apparatus carry out the wireless communication and the wireless power feeding in parallel with each other.

8. The wireless power feeding method according to claim 1, wherein
a capacitor is connected to a supply path of the received electric power to said power source circuit.

9. The wireless power feeding method according to claim 1, further comprising:
detecting, by the power feeding apparatus, whether said power receiving apparatus is moved outside a power feeding range of said power feeding apparatus and issuing a warning, when said power receiving apparatus on the secondary side is moved outside the power feeding range in a middle of the wireless power feeding.

10. The wireless power feeding method according to claim 1, further comprising:
detecting, by said power receiving apparatus, whether said power receiving apparatus is moved outside a power feeding range of said power feeding apparatus and issuing a warning, when said power receiving apparatus on the secondary side is moved outside the power feeding range in a middle of the wireless power feeding.

11. The wireless power feeding method according to claim 1, wherein
in a case where the secondary side is moved outside a power feeding range of a primary side in a middle of the wireless power feeding, said power receiving apparatus becomes inoperable.

12. The wireless power feeding method according to claim 1, further comprising:
supplying, along a first path of said power receiving apparatus, the received electric power directly from a regulator to said power source circuit,
supplying along a second path of said power receiving apparatus, the received electric power from said regulator to said power source circuit through a battery chargeable with the received electric power, and
switching over from said second path to said first path, when said power receiving apparatus is moved inside a power feeding range of said power feeding apparatus.

13. The wireless power feeding method according to claim 1, further comprising:
providing a buffer zone on an edge portion side of a power feeding range of the electric power fed by said power feeding apparatus, wherein the buffer zone becomes a boundary with an area outside of the power feeding range,
disposing a first power transmitting system, in an area except for the buffer zone of the power feeding range, and
disposing a second power transmitting system in the buffer zone,
wherein a transmission electric power output from said second power transmitting system is smaller than a transmission electric power output from said first power transmitting system, and wherein the transmission electric power output from said second power transmitting system is set to a value to operate an electronic apparatus on the secondary side.

14. The wireless power feeding method according to claim 13, further comprising:
reporting, by said power receiving apparatus, that said power receiving apparatus enters the buffer zone, when a voltage of the received electric power monitored by said power receiving apparatus becomes equal to or lower than a given voltage previously set, and
turning OFF a power source when said power receiving apparatus is moved to an area outside the buffer zone.

15. A power feeding method, comprising:
transmitting, by a first antenna a power feeding apparatus, an electric power to a power receiving apparatus for wireless power feeding;
carrying out, by the first antenna of the power feeding apparatus, wireless communication with a second antenna of the power receiving apparatus;
controlling, by one or more central processing units of the power feeding apparatus, availability of power consumption in said power receiving apparatus, wherein said availability of power consumption is controlled in accordance with a condition previously set, after said power feeding apparatus and said power receiving apparatus carry out authentication of the power receiving apparatus; and
determining, by the one or more central processing units of the power feeding apparatus, a file which is accessible by an electronic apparatus of said power receiving apparatus, wherein said file is determined in accordance with the condition previously set, after said power feeding apparatus and said power receiving apparatus carry out the authentication.

16. The power feeding method according to claim 15, wherein
the controlling comprises controlling, by the one or more central processing units of the power feeding apparatus, activation of an electronic apparatus of said power receiving apparatus, wherein said activation is controlled in accordance with the condition previously set.

17. A power receiving method, comprising:
receiving, by a first antenna of a power receiving apparatus, electric power from a power feeding apparatus;
communicating, by the first antenna of the power receiving apparatus, with a second antenna of the power feeding apparatus in a wireless manner; and
controlling, by one or more central processing units of the power receiving apparatus, availability of power consumption in said power receiving apparatus, wherein said availability of power consumption is controlled in accordance with a condition previously set, after said power feeding apparatus and said power receiving apparatus carry out authentication of the power receiving apparatus, wherein
the condition previously set comprises an identification (ID) of said power feeding apparatus as a primary side, an identification (ID) of said power receiving apparatus as a secondary side, available time for the power consumption, and available number of times for the power consumption.

18. The power receiving method according to claim 17, further comprising
feeding, by said power receiving apparatus, the electric power thus received to a power source circuit.

* * * * *